US009793566B2

United States Patent
Liu et al.

(10) Patent No.: US 9,793,566 B2
(45) Date of Patent: Oct. 17, 2017

(54) AQUEOUS ELECTROLYTES FOR REDOX FLOW BATTERY SYSTEMS

(71) Applicant: Battelle Memorial Institute, Richland, WA (US)

(72) Inventors: Tianbiao Liu, Richland, WA (US); Bin Li, Richland, WA (US); Xiaoliang Wei, Richland, WA (US); Zimin Nie, Richland, WA (US); Wei Wang, Kennewick, WA (US); Jun Liu, Richland, WA (US); Vincent L. Sprenkle, Richland, WA (US)

(73) Assignee: Battelle Memorial Institute, Richland, WA (US)

( * ) Notice: Subject to any disclaimer, the term of this patent is extended or adjusted under 35 U.S.C. 154(b) by 243 days.

(21) Appl. No.: 14/690,224

(22) Filed: Apr. 17, 2015

(65) Prior Publication Data

US 2016/0308233 A1    Oct. 20, 2016

(51) Int. Cl.
*H01M 8/18*  (2006.01)
*H01M 8/20*  (2006.01)

(52) U.S. Cl.
CPC .......... *H01M 8/188* (2013.01); *H01M 8/20* (2013.01); *H01M 2300/0002* (2013.01); *Y02E 60/528* (2013.01)

(58) Field of Classification Search
CPC . H01M 2300/0002; H01M 8/188; H01M 8/20
See application file for complete search history.

(56) References Cited

U.S. PATENT DOCUMENTS

| | | | |
|---|---|---|---|
| 6,143,443 A | * | 11/2000 | Kazacos ............... H01M 8/188 429/188 |
| 8,691,413 B2 | | 4/2014 | Esswein et al. |
| 8,753,761 B2 | | 6/2014 | Esswein et al. |
| 2005/0170247 A1 | | 8/2005 | Nakahara et al. |

(Continued)

FOREIGN PATENT DOCUMENTS

| | | | |
|---|---|---|---|
| CN | 1020355007 A | | 4/2011 |
| DE | 102014001816 | * | 8/2015 ............. B01D 71/06 |

(Continued)

OTHER PUBLICATIONS

Z. Li, S. Li, S. Liu; K. Huang; D. Fang; F. Wang; S. Peng. Electrochemical Properties of an All-Organic Redox Flow Battery Using 2,2,6,6-Tetramethyl-1-Piperidinyloxy and N-Methylphthalimide, Electrochemical and Solid-State Letters, 14 (12) A171-A173 (2011).*

(Continued)

*Primary Examiner* — Carlos Barcena
(74) *Attorney, Agent, or Firm* — Klarquist Sparkman, LLP

(57) ABSTRACT

An aqueous redox flow battery system includes an aqueous catholyte and an aqueous anolyte. The aqueous catholyte may comprise (i) an optionally substituted thiourea or a nitroxyl radical compound and (ii) a catholyte aqueous supporting solution. The aqueous anolyte may comprise (i) metal cations or a viologen compound and (ii) an anolyte aqueous supporting solution. The catholyte aqueous supporting solution and the anolyte aqueous supporting solution independently may comprise (i) a proton source, (ii) a halide source, or (iii) a proton source and a halide source.

26 Claims, 8 Drawing Sheets

(56) References Cited

U.S. PATENT DOCUMENTS

| | | |
|---|---|---|
| 2013/0224538 A1 | 8/2013 | Jansen et al. |
| 2014/0038036 A1 | 2/2014 | Nishide et al. |
| 2014/0141291 A1 | 5/2014 | Wang et al. |
| 2015/0236543 A1* | 8/2015 | Brushett ............... H02J 7/0052 429/81 |

FOREIGN PATENT DOCUMENTS

| | | | | |
|---|---|---|---|---|
| DE | WO 2015120971 A1 * | 8/2015 | ............ | H01M 4/368 |
| JP | 5082198 B2 | 9/2012 | | |
| JP | 5596908 B2 | 9/2014 | | |
| WO | WO 2014018593 A1 * | 1/2014 | ............ | H01M 8/188 |
| WO | WO 2014018605 A1 * | 1/2014 | ............ | H01M 8/188 |

OTHER PUBLICATIONS

International Search Report and Written Opinion, dated Jul. 1, 2016, issued in corresponding International Application No. PCT/US2016/027531.

Kim, Jae-Kwang et al., "Rechargeable organic radical battery with electrospun, fibrous membrane-based polymer electrolyte," *Journal of The Electrochemical Society*, 2007, vol. 154, No. 9, pp. A839-A843.

Lacey, Matthew J. et al., "A redox shuttle to facilitate oxygen reduction in the lithium air battery," *Electrochemistry Communications*, 2013, vol. 26, pp. 74-76.

Liu, Tianbiao et al., "A total organic aqueous redox flow battery employing a low cost and sustainable methyl viologen anolyte and 4-HO-TEMPO catholyte," *Advanced Energy Materials*, Dec. 1, 2015 (Online), vol. 6, No. 3, article No. 1501449 (8 internal pages).

Sen, Sujat et al., "Viologens as charge carriers in a polymer-based battery anode," *ACS Applied Materials & Interfaces*, 2013, vol. 5, No. 16, pp. 7825-7830.

Tokue, Hiroshi et al., "TEMPO/Viologen electrochemical heterojunction for diffusion-controlled redox mediation: a highly rectifying bilayer-sandwiched device based on cross-reaction at the interface between dissimilar redox polymers," *ACS Applied Materials & Interfaces*, 2014, vol. 6, No. 6, pp. 4043-4049.

* cited by examiner

AQUEOUS ELECTROLYTES FOR REDOX FLOW BATTERY SYSTEMS

ACKNOWLEDGMENT OF GOVERNMENT SUPPORT

This invention was made with government support under Contract DE-AC05-76RL01830, awarded by the U.S. Department of Energy. The government has certain rights in the invention.

FIELD

This invention concerns embodiments of an aqueous catholyte comprising an optionally substituted thiourea or a nitroxyl radical compound, and embodiments of an aqueous anolyte comprising metal cations or viologen cations for use in a redox flow battery system. This invention also concerns embodiments of redox flow battery systems including the disclosed aqueous catholytes and/or anolytes.

BACKGROUND

A redox flow battery (RFB) stores electrical energy in reduced and oxidized species dissolved in two separate electrolyte solutions, the anolyte and the catholyte. The anolyte and the catholyte circulate through a cell electrode separated by a membrane or separator. Redox flow batteries are advantageous for energy storage because they are capable of tolerating fluctuating power supplies, repetitive charge/discharge cycles at maximum rates, overcharging, overdischarging, and/or because cycling can be initiated at any state of charge.

However, among the many redox couples upon which redox flow batteries are based, a number of disadvantages exist. For example, many systems utilize redox species that are unstable, are highly oxidative, are difficult to reduce or oxidize, precipitate out of solution, and/or generate volatile gases. One of the main challenges confronting RFB systems is the intrinsically low energy density compared with other reversible energy storage systems, such as lithium-ion batteries. Additionally, many redox flow battery systems use electrolytes containing transition metals, such as the vanadium RFBs, which increases the cost of the electrolyte and thus the overall system. Therefore a need exists for RFB systems having a greater energy density and/or a lower cost electrolyte.

SUMMARY

Embodiments of aqueous catholytes and aqueous anolytes for use in a redox flow battery (RFB) system are disclosed. Embodiments of an RFB system also are disclosed.

Embodiments of the disclosed aqueous catholyte include a catholyte aqueous supporting solution and an electrochemically active component. The electrochemically active component is an optionally substituted thiourea and/or a nitroxyl radical compound.

The optionally substituted thiourea has a general formula I:

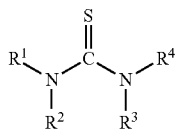

wherein $R^1$-$R^4$ independently are hydrogen, aliphatic, substituted aliphatic, alkoxy, substituted alkoxy, acyl, substituted acyl, aryl, substituted aryl, arylalkyl, substituted arylalkyl, alkylaryl, or substituted alkylaryl, the optionally substituted thiourea having a concentration sufficient to charge a redox flow battery system when the optionally substituted thiourea is oxidized. The optionally substituted thiourea may be monosubstituted, disubstituted, trisubstituted, or tetrasubstituted. In any or all of the above embodiments, the optionally substituted thiourea may be an alkyl-substituted thiourea. In some embodiments, the optionally substituted thiourea is N-methyl thiourea, N,N'-dimethyl thiourea, N-ethyl thiourea, N,N'-diethyl thiourea, tetramethyl thiourea, tetraethyl thiourea, or a combination thereof. In any or all of the above embodiments, the catholyte (including the aqueous supporting solution), prior to charging, may have a concentration of the optionally substituted thiourea within a range of 0.05 M to 5 M.

The nitroxyl radical compound has a general formula II:

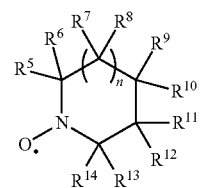

wherein n is 0, 1, or 2; $R^5$, $R^6$ and $R^9$-$R^{14}$ independently are hydrogen, aliphatic, substituted aliphatic, halo, hydroxyl, carboxyl, amino, cyano, or thiol; and each $R^7$ and $R^8$ independently is hydrogen, optionally substituted aliphatic, halo, hydroxyl, carboxyl, amino, cyano, or thiol, the nitroxyl radical compound having a concentration sufficient to charge a redox flow battery system when the nitroxyl radical compound is oxidized. In some embodiments, $R^5$, $R^6$ and $R^{11}$-$R^{14}$ independently are hydrogen or lower alkyl, each $R^7$ and $R^8$ independently is hydrogen or lower alkyl, and at least one of $R^9$ and $R^{10}$ is other than hydrogen. In an independent embodiment, $R^5$, $R^6$, $R^{13}$, and $R^{14}$ are independently lower alkyl; $R^7$, $R^8$, $R^{11}$, and $R^{12}$ are hydrogen; and at least one of $R^9$ and $R^{10}$ is hydroxyl, amino, carboxyl, or cyano. In any or all of the above embodiments, n may be 1. In certain embodiments, the nitroxyl radical compound is:

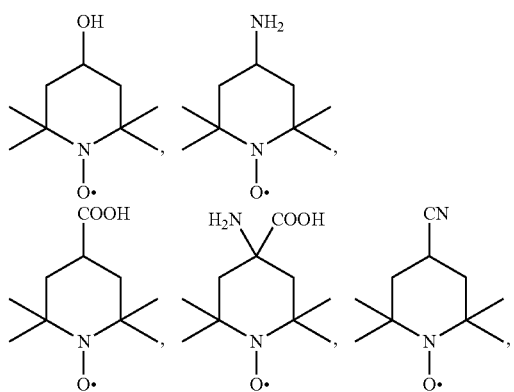

or any combination thereof.

In any or all of the above embodiments, the catholyte aqueous supporting solution may include (i) a proton source, (ii) a halide source, or (iii) a proton source and a halide source. In any or all of the above embodiments, the aqueous catholyte supporting solution may comprise a halide ($X^-$) source, where $[X^-] \geq$ [electrochemically active component]. In any or all of the above embodiments, the aqueous catholyte supporting solution may include a binary acid, an alkali metal halide, or a combination thereof.

In any or all of the above embodiments, prior to charging, the catholyte may consist essentially of (a) the optionally substituted thiourea or the nitroxyl radical compound, and (b) the aqueous catholyte supporting solution, wherein the aqueous catholyte supporting solution consists essentially of (i) water and (ii) the proton source, the halide source, or both the proton source and the halide source.

In one embodiment, an aqueous electrolyte system includes an aqueous catholyte according to any or all of the above embodiments and an aqueous anolyte comprising (i) an anolyte aqueous supporting solution and (ii) metal cations or a viologen compound as described below.

Some embodiments of an aqueous anolyte for use in a redox flow battery system include a non-acidic anolyte aqueous supporting solution comprising a halide source and a viologen compound providing viologen cations having a general formula III:

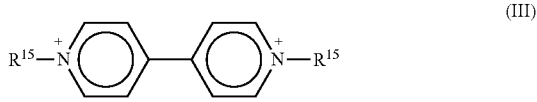

wherein $R^{15}$ is aliphatic, substituted aliphatic, aryl, or substituted aryl, the viologen compound having a concentration sufficient to charge a redox flow battery system when the viologen compound is reduced. In some embodiments, $R^{15}$ is lower alkyl, aryl, or arylalkyl. In some embodiments, the viologen compound comprises methyl viologen, ethyl viologen, phenyl viologen, benzyl viologen, or any combination thereof. In an independent embodiment, the anolyte consists essentially of the viologen compound, water, and the anolyte halide source.

In one embodiment, an aqueous electrolyte system includes an anolyte according to any or all of the above embodiments, and an aqueous catholyte comprising a non-acidic catholyte aqueous supporting solution comprising a catholyte halide source. The aqueous catholyte may further comprise (i) redox-active transition metal cations, (ii) an optionally substituted thiourea as described above, or (iii) a nitroxyl radical compound as described above.

Embodiments of a disclosed redox flow battery system includes an aqueous anolyte according to any or all of the above embodiments, an aqueous catholyte according to any or all of the above embodiments, and an ion-exchange membrane or porous separator. The redox flow battery system may further include an anode and a cathode.

In one embodiment, when the redox flow battery system is at least partially charged (e.g., the battery system is in a charging or discharging state), the catholyte comprises a redox pair consisting of (i) the optionally substituted thiourea and corresponding formamidinium disulfide cations, or (ii) the nitroxyl radical compound and corresponding nitroxyl compound cations; and the anolyte comprises (a) a metal redox pair comprising the metal cations or (b) a viologen redox pair consisting of +2 and +1 viologen cations. In one such embodiment, the catholyte consists essentially of (a) the optionally substituted thiourea and corresponding optionally substituted formamidinium disulfide cations or the nitroxyl radical compound and corresponding nitroxyl compound cations, and (b) the aqueous catholyte supporting solution, wherein the aqueous catholyte supporting solution consists essentially of (i) water and (ii) the proton source, the halide source, or both the proton source and the halide source. The aqueous catholyte supporting solution may consist essentially of water and a non-acidic halide source.

In an independent embodiment, when the redox flow battery system is at least partially charged, the aqueous anolyte comprises a viologen redox pair consisting of +2 and +1 viologen cations; and the aqueous catholyte comprises a redox pair consisting of (i) an optionally substituted thiourea and corresponding formamidinium disulfide cations, (ii) a nitroxyl radical compound and corresponding nitroxyl compound cations, or (iii) a $X^-/X_3^-$ redox pair where X is Br or I. The aqueous anolyte may consist essentially of the viologen redox pair consisting of +2 and +1 viologen cations, water, and the anolyte halide source.

The foregoing and other objects, features, and advantages of the invention will become more apparent from the following detailed description, which proceeds with reference to the accompanying figures.

DETAILED DESCRIPTION

Figure 1:
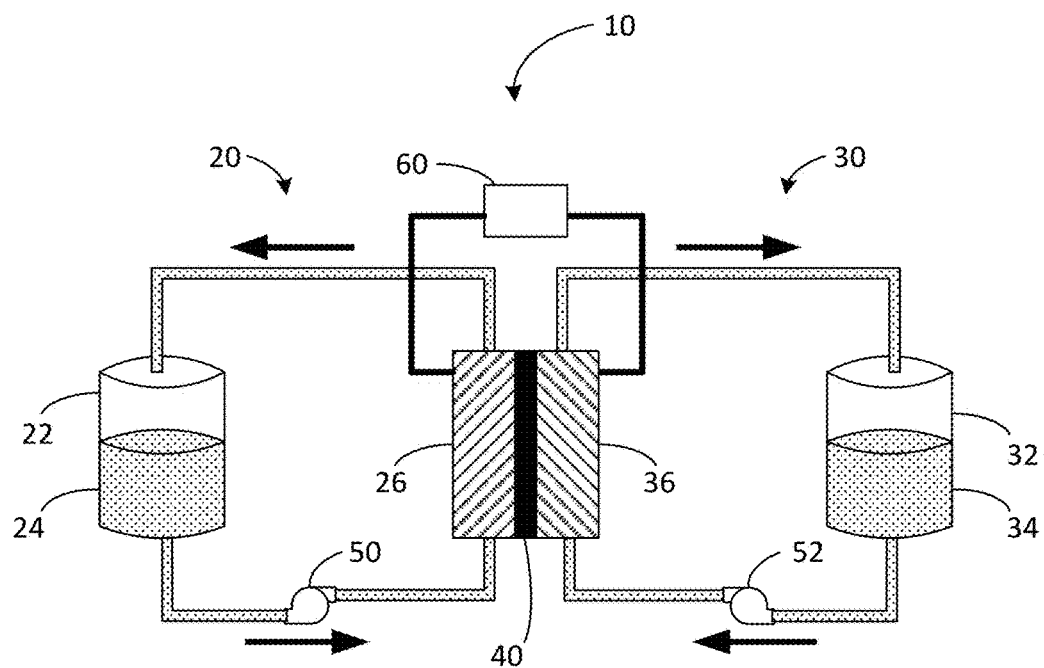
FIG. 1 is a schematic diagram of an exemplary redox flow battery system.

This disclosure concerns embodiments of aqueous catholytes and anolytes for use in a redox flow battery (RFB) system. Embodiments of an aqueous RFB system also are disclosed.

I. Definitions and Abbreviations

The following explanations of terms and abbreviations are provided to better describe the present disclosure and to guide those of ordinary skill in the art in the practice of the present disclosure. As used herein, "comprising" means "including" and the singular forms "a" or "an" or "the" include plural references unless the context clearly dictates otherwise. The term "or" refers to a single element of stated alternative elements or a combination of two or more elements, unless the context clearly indicates otherwise.

Unless explained otherwise, all technical and scientific terms used herein have the same meaning as commonly understood to one of ordinary skill in the art to which this disclosure belongs. Although methods and materials similar or equivalent to those described herein can be used in the practice or testing of the present disclosure, suitable methods and materials are described below. The materials, methods, and examples are illustrative only and not intended to be limiting. Other features of the disclosure are apparent from the following detailed description and the claims.

Unless otherwise indicated, all numbers expressing quantities of components, percentages, temperatures, times, and so forth, as used in the specification or claims are to be understood as being modified by the term "about." Accordingly, unless otherwise indicated, implicitly or explicitly, the numerical parameters set forth are approximations that may depend on the desired properties sought and/or limits of detection under standard test conditions/methods, as known to those persons of ordinary skill in the art. When directly and explicitly distinguishing embodiments from discussed prior art, the embodiment numbers are not approximates unless the word "about" is recited.

In order to facilitate review of the various embodiments of the disclosure, the following explanations of specific terms are provided:

Alkyl: A hydrocarbon group having a saturated carbon chain. The chain may be cyclic, branched or unbranched. The term lower alkyl means the chain includes 1-10 carbon atoms. Unless expressly referred to as an "unsubstituted alkyl," an alkyl group can either be unsubstituted or substituted.

Aliphatic: A substantially hydrocarbon-based compound, or a radical thereof (e.g., $C_6H_{13}$, for a hexane radical), including alkanes, alkenes, alkynes, including cyclic versions thereof, and further including straight- and branched-chain arrangements, and all stereo and position isomers as well. Unless expressly stated otherwise, an aliphatic group contains from one to twenty-five carbon atoms; for example, from one to fifteen, from one to ten, from one to six, or from one to four carbon atoms. The term "lower aliphatic" refers to an aliphatic group containing from one to ten carbon atoms. An aliphatic chain may be substituted or unsubstituted. An aliphatic group can be substituted with one or more substituents (up to two substituents for each methylene carbon in an aliphatic chain, or up to one substituent for each carbon of a —C=C— double bond in an aliphatic chain, or up to one substituent for a carbon of a terminal methine group).

Amino: A chemical functional group —N(R)R' where R and R' are independently hydrogen, alkyl, heteroalkyl, haloalkyl, aliphatic, heteroaliphatic, aryl (such as optionally substituted phenyl or benzyl), heteroaryl, alkylsulfano, or other functionality. A "primary amino" group is —NH$_2$. "Mono-substituted amino" means a radical —N(H)R substituted as above and includes, e.g., methylamino, (1-methylethyl)amino, phenylamino, and the like. "Di-substituted amino" means a radical —N(R)R' substituted as above and includes, e.g., dimethylamino, methylethylamino, di(1-methylethyl)amino, and the like.

Aryl: A monovalent aromatic carbocyclic group of, unless specified otherwise, from 6 to 15 carbon atoms having a single ring (e.g., phenyl) or multiple condensed rings in which at least one ring is aromatic (e.g., quinoline, indole, benzodioxole, and the like), provided that the point of attachment is through an atom of an aromatic portion of the aryl group and the aromatic portion at the point of attachment contains only carbons in the aromatic ring. If any aromatic ring portion contains a heteroatom, the group is a heteroaryl and not an aryl. Aryl groups are monocyclic, bicyclic, tricyclic or tetracyclic. Unless expressly referred to as an "unsubstituted aryl," an aryl group can either be unsubstituted or substituted.

Arylalkyl: An acyclic alkyl group in which one of the hydrogen atoms bonded to a carbon atom, typically a terminal or spa$^3$ carbon atom, is replaced with an aryl group. Benzyl is an exemplary arylalkyl group.

Capacity: The capacity of a battery is the amount of electrical charge a battery can store (charge capacity) and deliver (discharge capacity). The discharge capacity is typically expressed in units of mAh, or Ah, and indicates the maximum charge a battery can produce over a period of one hour. The term capacity fade refers to a decrease in the charge capacity over time and result in shorter charge/discharge cycles when the current/voltage is held constant.

Carboxyl: A chemical functional group with the formula —COOH. Substituted carboxyl refers to —COOR where R is aliphatic, heteroaliphatic, alkyl, or heteroalkyl.

Cell: As used herein, a cell refers to an electrochemical device used for generating a voltage or current from a chemical reaction, or the reverse in which a chemical reaction is induced by a current. Examples include voltaic cells, electrolytic cells, redox flow cells, and fuel cells, among others. Multiple single cells can form a cell assembly, often termed a stack. A battery includes one or more cells, or even one or more stacks.

Coulombic efficiency (CE): The efficiency with which charges are transferred in a system facilitating an electrochemical reaction. CE may be defined as the amount of charge exiting the battery during the discharge cycle divided by the amount of charge entering the battery during the charging cycle.

Electrochemically active component: A component (an element, an ion, or a compound) that is capable of forming redox pairs having different oxidation and reduction states, e.g., ionic species with differing oxidation states or a metal cation and its corresponding neutral metal atom. In a flow battery, an electrochemically active component refers to the chemical species that participate in the redox reaction during the charge and discharge processes, significantly contributing to the energy conversions that ultimately enable the battery to deliver/store energy. By "significantly contributing" is meant that a redox pair including the electrochemically active component contributes at least 10% of the energy conversions that ultimately enable the battery to deliver/store energy. In some embodiments, the redox pair including the electrochemically active component contributes at least 50%, at least 75%, at least 90%, or at least 95% of the energy conversions in a catholyte or anolyte comprising the electrochemically active component.

Electrolyte: A substance containing free ions and/or radicals that behaves as an ionically conductive medium. In a redox flow battery, some of the free ions and/or radicals are electrochemically active components. An electrolyte in contact with the anode, or negative half-cell, may be referred to as an anolyte, and an electrolyte in contact with the cathode, or positive half-cell, may be referred to as a catholyte. The anolyte and catholyte are often referred to as the negative electrolyte and positive electrolyte, respectively, and these terms can be used interchangeably. As used herein, the terms anolyte and catholyte refer to electrolytes composed of electrochemically active components and an aqueous supporting solution.

Energy efficiency (EE): The product of coulombic efficiency and voltage efficiency. EE=CE×VE.

Half-cell: An electrochemical cell includes two half-cells. Each half-cell comprises an electrode and an electrolyte. A redox flow battery has a positive half-cell in which electrochemically active components are oxidized, and a negative half-cell in which electrochemically active components are reduced during charge. Opposite reactions happen during discharge. In a thiourea-based redox flow battery, thiourea or substituted thiourea in the positive half-cell is oxidized to a corresponding formamidinium disulfide, and metal cations or methyl viologen cations in the negative half-cell are reduced during charge.

Halide source: A halogen-containing compound that dissociates in aqueous solution to provide at least some halide anions.

NHE: Normal hydrogen electrode. Zero potential is defined as the potential of a platinum electrode in 1N strong acid.

Proton source: A compound that dissociates in aqueous solutions to provide at least some protons ($H^+_{(aq)}$, $H_3O^+_{(aq)}$.

Redox pair or redox couple: An electrochemically active component and its corresponding oxidized (or reduced) component. Exemplary redox pairs include, but are not limited to, $Zn/Zn^{2+}$, $Cr^{2+}/Cr^{3+}$, thiourea/formamidinium disulfide.

Substituted: A fundamental compound, such as an aryl or aliphatic compound, or a radical thereof, having coupled thereto one or more substituents, each substituent typically replacing a hydrogen atom on the fundamental compound. Exemplary substituents include, but are not limited to, aliphatic (alkyl, alkenyl, or alkynyl), heteroalkyl, alkoxy, alkylaryl (e.g., $H_3C-C_6H_4-$), alkylthio, amino, amide, aryl, heteroaryl, arylalkyl (e.g., $C_6H_5CH_2-$), acyl (R—C (O)—), hydroxyl, thiol, thioalkoxy, alkylamino, aminoalkyl, or other organic functionality. As used herein with respect to thiourea, substituted refers to a thiourea, $H_2NC(S)NH_2$, in which one or more of the hydrogen atoms has been replaced with a substituent. Exemplary thiourea substituents include, but are not limited to, aliphatic (alkyl, alkenyl, or alkynyl), alkoxy, acyl, aryl, arylalkyl, and alkylaryl substituents. Each substituent may be further substituted, e.g., haloaliphatic, haloalkoxy, haloaryl, aminoaliphatic, aminoaryl, etc.

Voltage efficiency (VE): The voltage produced by the battery while discharging divided by the charging voltage.

Working potential: The electrode potential of a cell constructed with a standard hydrogen electrode and the electrode/redox pair under investigation.

II. Redox Flow Battery System

Redox flow batteries (RFBs) can provide electrical energy converted from chemical energy continuously, and are promising systems for energy storage to integrate renewable energies (e.g., solar and/or wind energy) into electrical supply grids. As shown in FIG. 1, a typical RFB comprises a positive half-cell 20 and a negative half-cell 30. The half-cells are separated by a membrane or separator 40, such as an ion-exchange membrane (cation- or anion-exchange membrane), ion conductive membrane (polymer or ceramic) or porous separator. The positive half-cell 20 comprises an electrode tank 22 containing a catholyte 24 and the negative half-cell 30 comprises an electrode tank 32 containing an anolyte 34. The anolyte and catholyte are solutions comprising electrochemically active components in different oxidation states. The electrochemically active components in the catholyte and anolyte couple as redox pairs. In some embodiments, at least one of the catholyte and anolyte redox active materials remains fully soluble during the charging and discharging cycles of the RFB. However, one member of a redox pair may be insoluble or partially soluble during the charging and discharging cycles of the RFB. For example, when the anolyte comprises a metal cation/metal atom redox pair, only the cation can remain fully soluble during the charging and discharging cycles.

During charging and discharging of the RFB, the catholyte and anolyte are continuously circulating via pumps 50, 52 through the positive and negative electrodes 26, 36, respectively, where redox reactions proceed, providing the conversion between chemical energy and electrical energy or vice-versa. To complete the circuit during use, positive and negative electrodes (including a current collector at each side) 26, 36 of the RFB system 10 are electrically connected through current collectors (not shown) with an external load 60.

Embodiments of the disclosed redox flow battery systems have one or more advantages compared to other redox flow battery systems, such as a lower working potential (e.g., lower than $V^{4+}/V^{5+}$ (1.00 V vs. NHE) and bromine/bromide (1.087 V vs. NHE)), the ability to use a low-cost membrane or separator to separate the half cells, and/or operability in a neutral or alkaline environment, which reduces evolution of hydrogen at the negative half-cell and corrosion throughout the system compared to acid-based redox flow battery systems.

A. Aqueous Thiourea-Based Catholyte

Embodiments of an aqueous thiourea-based catholyte comprise (i) an optionally substituted thiourea, and (ii) a catholyte aqueous supporting solution. The optionally substituted thiourea is not merely an additive, but instead substantially participates in the redox reaction as an electrochemically active component during the charge and discharge processes. In some embodiments, the optionally substituted thiourea and its corresponding formamidinium disulfide cation are the only electrochemically active components of the catholyte. Unless explicitly stated, the catholyte does not include a non-aqueous solvent. The catholyte aqueous supporting solution may comprise a proton source, a halide source, or both a proton source and a halide source. As described below, a single source may provide both protons and halide anions. In an independent embodiment, the catholyte as initially prepared (i.e., prior to charging of the redox flow battery system) consists essentially of, or consists of, (i) an optionally substituted thiourea, and (ii) the aqueous supporting solution. As used herein, "consists essentially of" means that the catholyte does not include any other electrochemically active component. In another independent embodiment, the catholyte as initially prepared (i.e., prior to charging of the redox flow battery system) consists essentially of, or consists of, (i) an optionally substituted thiourea, (ii) redox-active metal cations or viologen cations, and (iii) the aqueous supporting solution.

As oxidation occurs in the catholyte during battery charging, molecules of the thiourea (TU) or substituted thiourea (s-TU) are oxidized to form corresponding formamidinium disulfide cations (FDS or s-FDS, respectively).

$$2TU(\text{or s-TU}) \rightarrow \{FDS\}^{2+}(\text{or }\{s\text{-}FDS\}^{2+}) + 2e^-$$

For example, when the catholyte comprises N-methylthiourea:

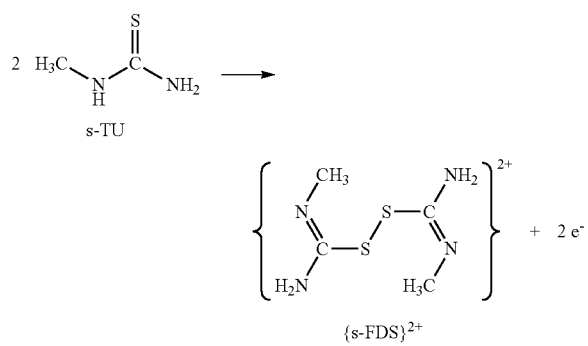

Thus, when the battery is at least partially charged (e.g., during a charging or discharging state), the catholyte comprises, consists essentially of, or consists of (i) an optionally substituted thiourea, (ii) corresponding optionally substituted formamidinium disulfide cations, (iii) water, and (iv) a proton source, a halide source, or both a proton source and a halide source.

The catholyte may comprise thiourea and/or a substituted thiourea according to general formula I

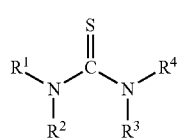

(I)

where $R^1$-$R^4$ independently are hydrogen, optionally substituted aliphatic, optionally substituted alkoxy, optionally substituted acyl, optionally substituted aryl, optionally substituted arylalkyl, or optionally substituted alkylaryl. In some embodiments, $R^1$-$R^4$ independently are hydrogen, optionally substituted aliphatic, or optionally substituted aryl. Thus, the substituted thiourea may be an aliphatic- or aryl-substituted thiourea. In an independent embodiment, $R^1$-$R^4$ independently are hydrogen or alkyl, such as lower alkyl or $C_1$-$C_4$ alkyl. The substituted thiourea may be mono-substituted, disubstituted, trisubstituted, or tetrasubstituted. A disubstituted thiourea may be N,N- or N,N'-substituted. When a substituted thiourea includes more than one substituent, the substituents may be the same or different from one another. In some of embodiments, the substituted thiourea is an aliphatic- or aryl-substituted thiourea. The aliphatic or aryl group(s) may be substituted, e.g., haloalkyl or haloaryl. In an independent embodiment, the substituted thiourea is an alkyl-substituted thiourea, such as a lower alkyl-substituted thiourea.

Substituted thioureas include, but are not limited to, N-methyl thiourea, N,N'-dimethyl thiourea, N-ethyl thiourea, N,N'-diethyl thiourea, tetramethyl thiourea, tetraethyl thiourea, N,N'-diisopropyl thiourea, N,N'-dibutyl thiourea, acetylthiourea, N-allyl thiourea, N-phenyl thiourea, N-halophenyl thiourea, N-(dihalophenyl)thiourea, N-(trihalophenyl)thiourea, N,N'-diphenylthiourea. In some embodiments, the catholyte comprises thiourea, N-methyl thiourea, N,N'-dimethyl thiourea, N-ethyl thiourea, N,N'-diethyl thiourea, tetramethyl thiourea, or tetraethyl thiourea. The foregoing list of exemplary substituted thioureas does not indicate that each of the substituted thioureas will have equivalent performances. In an independent embodiment, the catholyte comprises N-methyl thiourea or N,N'-dimethyl thiourea.

The optionally substituted thiourea is present in the catholyte in a concentration sufficient to charge a redox flow battery system when the optionally substituted thiourea is oxidized. In certain embodiments, the concentration of optionally substituted thiourea in the catholyte (including the aqueous supporting solution) is greater than 5 wt %. In some embodiments, the aqueous concentration of the optionally substituted thiourea, prior to combining with the aqueous supporting solution, is within a range of from 0.1 M to 10 M, such as from 0.2 M to 8 M, or 0.2 M to 5 M. In certain embodiments, the concentration of the optionally substituted thiourea in the catholyte (including the aqueous supporting solution) is within a range of from 0.05 M to 5 M, such as from 0.1 M to 5 M, or from 0.2 M to 5 M.

The catholyte further comprises an aqueous supporting solution comprising a proton source, a halide source, or both a proton source and a halide source. Unless expressly stated, the aqueous supporting solution does not comprise electrochemically active components. The aqueous supporting solution may consist essentially of, or consist of, water and (i) the proton source, (ii) the halide source, or (iii) the proton source and the halide source. In some embodiments, the aqueous supporting solution consists essentially of, or consists of, water and a non-acidic halide source.

Suitable proton sources include strong acids, e.g., HCl, HBr, HI, $HNO_3$, $H_2SO_4$, $H_3PO_4$. In some embodiments, the proton source is a binary acid. In an independent embodiment, the proton source is HCl. If included, the proton source may be present in an amount sufficient to provide the catholyte with a proton concentration ≥0.1 M or ≥0.5 M, such as a proton concentration from 0.1-12 M, 0.2-10 M, or 0.5-6 M.

The halide source may be a non-acidic halide source. Suitable non-acidic halide sources include soluble halide salts, such as soluble metal halides, e.g., Group I metal halides and Group II metal halides (e.g., $MgCl_2$). In certain embodiments, the halide salt is an alkali metal halide, such as LiCl, NaCl, or KCl. In an independent embodiment, the aqueous supporting solution includes NaCl. If included, the halide source may be present in an amount sufficient to provide the catholyte with a halide concentration ≥0.1 M or ≥0.5 M, such as a halide concentration from 0.1-10 M, 0.5-10 M, or 0.5-5 M. When the aqueous supporting solution comprises a halide salt, the catholyte may have a relatively neutral pH, such as a pH from 5-9 or a pH from 6-8.

The aqueous supporting solution may include both a proton source and a halide source. Suitable proton sources include strong acids, e.g., HCl, HBr, HI, HNO$_3$, H$_2$SO$_4$, H$_3$PO$_4$. Suitable halide sources include soluble halide salts, such as soluble metal halides, e.g., Group I metal halides and Group II metal halides. The proton and halide may be provided by a single source, such as a binary acid. In an independent embodiment, the aqueous supporting solution includes HCl. If the proton and halide are provided by a single source, the proton/halide source may be present in a concentration ≥0.1 M or ≥0.5 M, such as a concentration from 0.1-12 M, 0.5-10 M, or 0.5-5 M.

In some embodiments, the aqueous supporting solution comprises a binary acid, an alkali metal halide, or a combination thereof. For example, the aqueous supporting solution may comprise, consist essentially of, or consist of water and NaCl, KCl, HCl, or a combination thereof.

The proton source, the halide source, or a proton/halide source may be present in the aqueous supporting solution at a concentration sufficient to provide a proton concentration and/or a halide ion concentration in the catholyte greater than or equal to a concentration of the thiourea or substituted thiourea in the catholyte. As one non-limiting example, if the catholyte (including the aqueous supporting solution) comprises 0.5 M thiourea or substituted thiourea, the proton source, halide source, or proton/halide source is present in a concentration sufficient to provide ≥0.5 M protons, halide ions, or protons and halide ions in the catholyte.

B. Aqueous Nitroxyl Radical Compound-Based Catholyte

Embodiments of an aqueous nitroxyl radical compound-based catholyte comprise (i) a catholyte aqueous supporting solution and (ii) a water-soluble nitroxyl radical compound. The nitroxyl radical compound is not merely an additive, but instead substantially participates in the redox reaction as an electrochemically active component during the charge and discharge processes; in other words, the nitroxyl radical compound contributes at least 10% of the energy conversions that ultimately enable the battery to deliver/store energy. In some embodiments, the nitroxyl radical compound and its corresponding cation are the only electrochemically active components of the catholyte. Unless explicitly stated, the catholyte does not include a non-aqueous solvent. In an independent embodiment, the catholyte as initially prepared (i.e., prior to charging of the redox flow battery system) consists essentially of, or consists of, (i) a water-soluble nitroxyl radical compound, and (ii) the aqueous supporting solution. As used herein, "consists essentially of" means that the catholyte does not include any other electrochemically active component. In another independent embodiment, the catholyte as initially prepared (i.e., prior to charging of the redox flow battery system) consists essentially of, or consists of, (i) a water-soluble nitroxyl radical compound, (ii) redox-active metal cations or viologen cations, and (iii) the aqueous supporting solution.

The nitroxyl radical compound has a structure according to formula II:

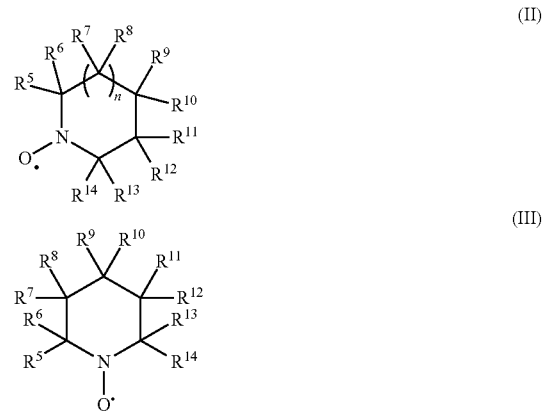

wherein n is 0, 1, or 2, providing a 5- to 7-membered ring; $R^5$, $R^6$ and $R^9$-$R^{14}$ independently are hydrogen, optionally substituted aliphatic, halo, hydroxyl, carboxyl, amino, cyano, or thiol; and each $R^7$ and $R^8$ independently is hydrogen, optionally substituted aliphatic, halo, hydroxyl, carboxyl, amino, cyano, or thiol. Exemplary substituted aliphatic groups include, but are not limited to, e.g., aminoalkyl (—R'NH$_2$), cyanoalkyl (—R'CN), haloalkyl (—R'X) hydroxyalkyl (—R'OH), and thioalkyl (—R'SH), where R' is alkyl and X is halo.

In some embodiments, n is 1, and the nitroxyl radical compound has a 6-membered ring structure according to formula III. In certain embodiments, at least one of $R^9$ and $R^{10}$ is other than hydrogen. In some embodiments, $R^5$, $R^6$ and $R^{11}$-$R^{14}$ independently are hydrogen or lower alkyl, and each $R^7$ and $R^8$ independently is hydrogen or lower alkyl; the lower alkyl substituents may be the same or different from one another. In an independent embodiment, $R^5$, $R^6$, $R^{13}$, and $R^{14}$ independently are lower alkyl, and $R^7$, $R^8$, $R^{11}$, and $R^{12}$ are hydrogen. In another independent embodiment, $R^5$, $R^6$, $R^{13}$, and $R^{14}$ are methyl; $R^7$, $R^8$, $R^{11}$, and $R^{12}$ are hydrogen; and at least one of $R^9$ and $R^{10}$ is hydroxyl, amino, carboxyl, or cyano. In yet another embodiment, n is 1; $R^5$, $R^6$, $R^{13}$, and $R^{14}$ are methyl; $R^7$, $R^8$, $R^{11}$, and $R^{12}$ are hydrogen; and at least one of $R^9$ and $R^{10}$ is hydroxyl, amino, carboxyl, or cyano.

Exemplary nitroxyl radical compounds include, but are not limited to, the following compounds and combinations thereof:

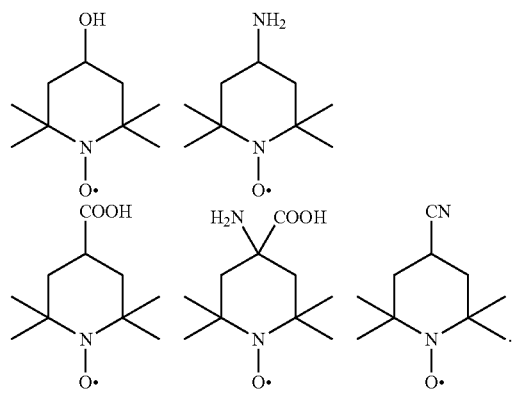

A person of ordinary skill in the art of organic chemistry understands that all carbon atoms in the ring are sp$^3$ hybridized, and that hydrogen atoms are present in the above structures at $R^7$, $R^8$, $R^{11}$, and $R^{12}$, and also at $R^{10}$ when no other substituent is shown. The foregoing list of exemplary nitroxyl radical compounds does not indicate that each of the nitroxyl radical compounds will have equivalent performances.

Properties of the nitroxyl radical compound-based catholyte can be tuned by varying the substituent(s) para to the nitrogen atom. The substituent(s) at $R^9$ and/or $R^{10}$ affect compound solubility, volumetric capacity, membrane compatibility, and/or cell voltage.

At the cathode, embodiments of the nitroxyl radical compounds are oxidized to form a cation. For example, 4-hydroxy-2,2,6,6-tetramethylpiperidine 1-oxyl (HTMPO) has a stable one-electron redox couple at 0.75 V vs. SHE in neutral aqueous solution:

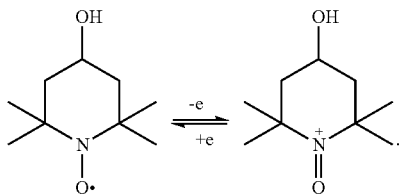

The nitroxyl radical compound is present in the catholyte in a concentration sufficient to charge a redox flow battery system when the nitroxyl radical compound is oxidized. In some embodiments, the concentration of the nitroxyl radical compound in the catholyte is greater than 1 mM, such as from 1 mM to 5 M, from 5 mM to 3 M, from 10 mM to 3 M, or from 0.1 M to 3 M.

Embodiments of the disclosed nitroxyl radical compound-based catholytes further comprise a catholyte aqueous supporting solution comprising a proton source, a halide source, or both a proton source and a halide source, as previously described. Unless expressly stated, the aqueous supporting solution does not comprise electrochemically active components. In some embodiments, the catholyte aqueous supporting solution comprises a non-acidic halide source. In an independent embodiment, the catholyte aqueous supporting solution includes NaCl.

If included, the proton source may be present in an amount sufficient to provide the catholyte with a proton concentration ≥0.01 M, ≥0.1 M, or ≥0.5 M, such as a proton concentration from 0.01-12 M, 0.1-10 M, or 0.5-6 M. If included, the halide source may be present in an amount sufficient to provide the catholyte with a halide concentration ≥0.01 M, ≥0.1 M or ≥0.5 M, such as a halide concentration from 0.01-10 M, 0.1-10 M, or 0.5-5 M. The halide source may be present in the aqueous supporting solution at a concentration sufficient to provide a halide ion concentration in the catholyte greater than or equal to a concentration of the nitroxyl radical compound in the catholyte. As one non-limiting example, if the catholyte (including the aqueous supporting solution) comprises 0.1 M nitroxyl radical compound, the halide source is present in a concentration sufficient to provide ≥0.1 M halide ions in the catholyte. The proton and halide may be provided by a single source, such as a binary acid. If the proton and halide are provided by a single source, the proton/halide source may be present in a concentration ≥0.01 M, ≥0.1 M or ≥0.5 M, such as a concentration from 0.01-12 M, 0.1-10 M, 0.5-10 M, or 0.5-5 M.

The aqueous supporting solution may consist essentially of, or consist of, water and (i) the proton source, (ii) the halide source, or (iii) the proton source and the halide source. In some embodiments, the aqueous supporting solution consists essentially of, or consists of, water and a non-acidic halide source. In some embodiments, the aqueous supporting solution comprises an alkali metal halide. For example, the aqueous supporting solution may comprise, consist essentially of, or consist of (i) water and (ii) NaCl, KCl, or a combination thereof.

In some embodiments, nitroxyl radical compound-based catholyte comprises HTMPO. HTMPO has a solubility in water up to 3 M, providing a volumetric capacity of up to 80.2 Ah/L, which is significantly greater than the current start-of-art vanadium-based aqueous redox flow battery with a volumetric capacity up to 67 Ah/L.

Suitable anolytes for use with the disclosed nitroxyl radical compound-based catholytes include metal cation-based anolytes and viologen-based anolytes as disclosed herein. In some embodiments, a catholyte comprising HTMPO is used with an anolyte comprising methyl viologen.

C. Anolyte

The anolyte comprises (i) metal cations or a viologen compound comprising viologen cations and (ii) an anolyte aqueous supporting solution comprising a proton source, a halide source, or a proton source and a halide source. Unless explicitly stated, the anolyte does not include a non-aqueous solvent. As the battery is charged, at least some of the metal cations or the viologen cations are reduced. During discharge, metal cations, metal atoms, or viologen cations are oxidized.

In some embodiments, the anolyte comprises a metal redox pair. The redox pair may include a metal cation and a corresponding reduced metal atom, or a metal cation and a corresponding partially reduced metal cation. Suitable metal redox pairs include, but are not limited to, $Zn/Zn^{2+}$, $Fe/Fe^{2+}$, $Cr^{2+}/Cr^{3+}$, and $V^{2+}/V^{3+}$. A $Zn/Zn^{2+}$ redox pair may be provided, for example, by $Zn/Zn^{2+}$, $Zn/Zn(OH)_4^{2+}$, $Zn/Zn(CN)_4^{2+}$, or $Zn/Zn(tartrate)_4^{2+}$, among others. The anolyte can be prepared by dissolving a metal compound comprising the oxidized member of the redox pair in an aqueous solution, such as the anolyte aqueous supporting solution. In some examples, anolytes were prepared from $ZnSO_4$, $FeCl_2$, $V_2(SO_4)_3$, or $VCl_3$. As the battery is charged, oxidized cations of the redox pair are reduced.

In some embodiments, the anolyte comprises viologen cations (provided by 4,4'-bipyridinium salts, i.e., viologen compounds) as the active materials. In certain embodiments, the viologen cations are the only electrochemically active components of the anolyte. The viologen compound provides cations having a general formula (III):

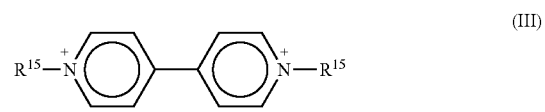

(III)

where each $R^{15}$ independently is optionally substituted aliphatic, optionally substituted aryl, or optionally substituted arylalkyl. In some embodiments, each $R^{15}$ independently is optionally substituted lower alkyl, optionally substituted aryl, or optionally substituted arylalkyl. In certain embodiments, each $R^{15}$ is the same and is optionally substituted lower alkyl, optionally substituted aryl, or optionally substituted arylalkyl. In an independent embodiment, each $R^{15}$ is the same and is methyl, ethyl, phenyl, or benzyl.

The viologen cations reversibly accept one electron to form a +1 cation. Addition of a second electron to produce a neutral compound is generally not reversible.

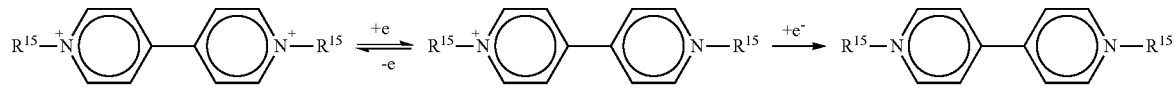

As the battery is charged, +2 cations are reduced to +1 cations. As the battery discharges, the +1 cations are oxidized to +2 cations. When the anolyte comprises viologen cations, the battery system may include an anion-exchange membrane. Viologen-based anolytes may be incompatible with a cation-exchange membrane.

The identity of $R^{15}$ may affect the redox potential. For example, an electron-withdrawing group (e.g., phenyl) produces a more positive potential than an electron-donating group (methyl). Thus, with respect to positive potential, phenyl>benzyl>alkyl. Substituents on $R^{15}$ (e.g., substituted aliphatic or substituted aryl) also can modulate the potential with electron-withdrawing substituents making the potential more positive and electron-donating substituents producing a less positive potential. In one embodiment, ethyl viologen diiodide (EV, $R^{15}=CH_3CH_2-$) has a stable one electron reduction couple at $-0.44$ V vs. SHE in neutral aqueous solution (see, e.g., Example 6, FIG. 10), making the compound an excellent anolyte for use in the disclosed redox flow batteries. The second electron reduction couple is about +1.48 V vs. SHE in neutral aqueous solution, and is not reversible.

Exemplary viologen cations include, but are not limited to, methyl viologen cations ($MV^{2+}$), ethyl viologen cations ($EV^{2+}$), phenyl viologen cations ($PV^{2+}$), and benzyl viologen cations ($BV^{2+}$). The foregoing list of exemplary viologen cations does not indicate that each of the viologen cations will have equivalent performances. Exemplary viologen compounds include halide salts. In certain embodiments, the viologen compound is a chloride salt. In one example, methyl viologen cations are provided by methyl viologen dichloride hydrate (i.e., N,N'-dimethyl-4,4'-bipyridinium dichloride). In another example, ethyl viologen cations are provided by ethyl viologen diiodide.

A viologen-based anolyte can be used in combination with a catholyte comprising an optionally substituted thiourea as disclosed herein, a catholyte comprising a nitroxyl radical compound as disclosed herein, a catholyte comprising a metal redox pair (e.g., $Fe^{2+}/Fe^{3+}$), or a catholyte comprising a $X_3^-/X^-$ redox couple where X is halo, such as Br or I (e.g., a catholyte comprising aqueous KI).

The anolyte further comprises an anolyte aqueous supporting solution comprising a proton source, a halide source, or both a proton source and a halide source. Unless expressly stated, the aqueous supporting solution does not comprise electrochemically active components. The proton sources, halide sources, combined proton/halide sources, and concentrations thereof are as described above for the catholyte aqueous supporting solution. In some embodiments, the proton source, the halide source, or a proton/halide source is present in the aqueous supporting solution at a concentration sufficient to provide a proton concentration and/or a halide ion concentration greater than or equal to a concentration of the metal redox pair or viologen cations in the anolyte.

In some embodiments, when the anolyte comprises viologen cations, the aqueous supporting solution is a non-acidic solution comprising a halide source. An anolyte comprising viologen cations and an aqueous supporting solution may have a relatively neutral pH, such as a pH from 5-9 or a pH from 6-8. Typically, when the anolyte comprises viologen cations and a non-acidic aqueous supporting solution, the aqueous catholyte supporting solution also is a non-acidic aqueous solution comprising a halide source.

In some embodiments, the anolyte consists essentially of, or consists of, (i) water, (ii) redox-active metal cations or viologen cations, and (iii) the aqueous supporting solution. As used with respect to the anolyte, the term "consists essentially of" includes corresponding, non-redox-active anions of the metal compound or viologen compound from which the anolyte is prepared but excludes other electrochemically active components. In an independent embodiment, the anolyte as initially prepared (i.e., prior to charging of the redox flow battery system), consists essentially of, or consists of, (i) water, (ii) metal cations (i.e., the oxidized species of the redox metal pair) or viologen +2 cations, and (iii) the aqueous supporting solution The anolyte aqueous supporting solution and catholyte supporting solution may have the same chemical composition. In some examples described below, the anolyte aqueous supporting solution and catholyte aqueous supporting solution were 1 M NaCl.

In some embodiments, the relative concentrations of electrochemically active components in the anolyte and catholyte, as prepared prior to charging the battery, are selected to provide a substantially similar number (i.e., ±20%) of electrons when oxidized during operation of the redox flow battery system. In other words, the concentration of metal cations or viologen cations in the anolyte as initially prepared are selected to provide sufficient electrons during reduction to oxidize substantially all of the optionally substituted thiourea molecules or nitroxyl radical compounds in the catholyte. For example, when the anolyte comprises $Zn/Zn^{2+}$, the concentration of $Zn^{2+}$ may be substantially equal to 0.5× the concentration of the optionally substituted thiourea when the battery system is in a completely discharged state. Thus, the anolyte (including the aqueous supporting solution) may have an initial concentration, prior to charging the battery system, of 100 mM $ZnSO_4$ when the catholyte (including the aqueous supporting solution) has an initial concentration of 200 mM optionally substituted thiourea. In an independent embodiment, the anolyte (including the aqueous supporting solution) may have an initial concentration, prior to charging the battery system of 200 mM viologen 2+ when the catholyte (including the aqueous supporting solution) has an initial concentration of 200 mM optionally substituted thiourea.

D. Electrodes

Redox flow battery systems include an anode and a cathode. Suitable electrodes include carbon-based electrodes and metal-based electrodes. Bare metal electrodes can be used when the electrolyte has a neutral pH, e.g., pH of 5-9. Suitable metal-based electrodes include, but are not limited to, gold, Pt-coated gold, or Pt-coated carbon-based material. Various catalyst particles, such as Pt and Au, can be deposited on the electrode surface to improve the flow battery performance. Carbon-based materials with different forms and/or structures can also be used, such as porous carbon (e.g., carbon felt, graphite felt), carbon nanotubes, nanowires, and graphene.

In some embodiments, the cathode is a carbon-based electrode, e.g., graphite felt. The graphite felt may have a surface area >0.3 m$^2$/g. The anode is selected based at least in part on the selection of the redox pair in the anolyte. When the anolyte comprises viologen cations, the anode may be a carbon-based electrode, e.g., graphite felt. When the redox pair comprises metal cations or a metal cation/metal atom redox pair, the anode may be a carbon-based electrode or a metal electrode, such as a metal electrode comprising the same metal as the redox pair. For example, when the anolyte comprises Zn/Zn$^{2+}$, the anode may be a zinc anode.

E. Battery System Characteristics

Embodiments of the disclosed catholytes have a lower working potential than catholytes in other redox flow battery systems. For example, the working potential of a thiourea-based or substituted thiourea-based redox couple is around 0.57 V vs. NHE. Because of the absence of active species with a strong oxidation nature, such as V$^{5+}$ and Br$_2$, and/or the presence of a neutral catholyte aqueous supporting solution, the catholyte provides more freedom to widely select membrane materials and additives in such flow batteries. Advantageously, optionally substituted thioureas are stable redox species that are readily oxidized, do not precipitate out of solution, and do not generate volatile gases during oxidation/reduction, which is beneficial to obtain high CE values and good cycling performance. In addition, one factor determining energy density in RFBs is the concentration of active species in the electrolytes. Optionally substituted thioureas as catholytes can achieve a high concentration in water, such as a concentration up to 10 M, which shows great potential in actual application.

The working potential of a water-soluble nitroxyl radical compound-based redox couple is around 0.8 V vs. SHE. Similar to thiourea-based catholytes, a nitroxyl radical compound-based catholyte also provides more freedom to select membrane materials and additives in such flow batteries.

Embodiments of the disclosed redox flow battery systems exhibit stable performance characteristics over repeated charge/discharge cycles. By "stable performance characteristics" is meant that the performance characteristics do not significantly change over repeated cycling of the battery system. In some embodiments, the current and voltage vary by less than 10% over at least 5 cycles, at least 10 cycles, or at least 15 cycles. The current and voltage characteristics may remain substantially the same over at least 10,000 seconds, at least 50,000 seconds, at least 100,000 seconds, or at least 150,000 seconds. Thus, RFB systems including embodiments of the disclosed catholyte provide stable performance without requiring high concentrations of acids and/or expensive separator membranes between the half cells.

In some embodiments, the redox flow battery system has a capacity that remains stable over repeated charge/discharge cycles. For example, the battery system may exhibit less than 30% capacity fade over 10 cycles, over 25 cycles, over 50 cycles, over 75 cycles, or even over 100 cycles. In some embodiments, the battery system may exhibit less than 20% capacity fade or even less than 10% capacity fade over 10 cycles, over 25 cycles, over 50 cycles, over 75 cycles, or even over 100 cycles.

The disclosed redox flow battery systems may exhibit a coulombic efficiency from 90-100%, with the coulombic efficiency varying by less than 10% over at least 10 cycles, at least 20 cycles, at least 40 cycles, at least 50 cycles, at least 75 cycles, or even at least 100 cycles. Some embodiments of the redox flow battery systems have a voltage efficiency and an energy efficiency of at least 50%, such as from 50% to 90%, over at least 10 cycles, at least 20 cycles, at least 40 cycles, at least 50 cycles, at least 75 cycles, or even at least 100 cycles. Hence, RFB systems including embodiments of the disclosed catholyte provide superior efficiency without the disadvantages of existing RFB systems. Optionally substituted thioureas are stable redox species that are readily oxidized, do not precipitate out of solution, and do not generate volatile gases during oxidation/reduction.

III. Examples

General Procedure: A single cell 10 as shown in FIG. 1 was constructed using porous graphite felt as the cathode 26 and the anode 36. As indicated in each example, a cation-exchange membrane, anion-exchange membrane, or microporous separator 40 was placed between the electrodes. Catholytes 24 were prepared by dissolving indicated amounts of thiourea or substituted thiourea (s-TU) powders into deionized water at room temperature. The indicated anolytes 34 were prepared by methods known to one of ordinary skill in the art of redox flow battery systems. Reservoirs 22, 32 containing the catholyte 24 and anolyte 34 were connected to the cathode 26 and anode 36. Pumps 50, 52 were used to pump catholyte 24 and anolyte 34 through the half cells 20, 30 at a flow rate of 20 mL/minute. The electrochemical performance of the flow cell 10 was tested using a BT-2000 potentiostat/galvanostat station (Arbin Instruments, College Station, Tex.) under a constant charge/discharge current density of 5 mA·cm$^{-2}$ within an appropriate voltage window. A CV (cyclic voltammogram) test was conducted in a three-electrode cell using a CHI660C workstation (CH Instruments, USA); platinum wire, glassy carbon, and Ag/AgCl electrodes were used at the counter, working, and reference electrodes, respectively.

Example 1

Electrolyte Stability

Figure 2:
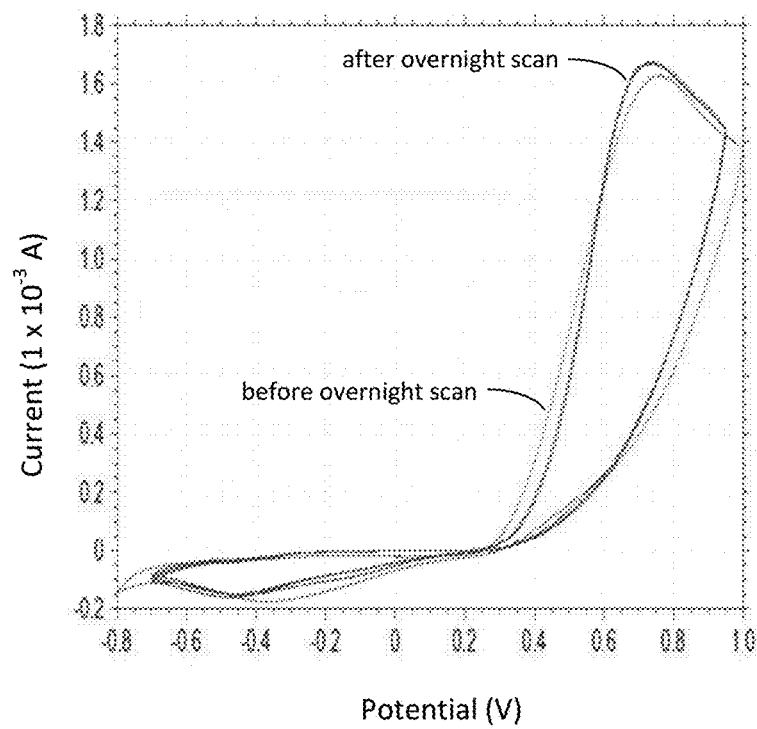
FIG. 2 shows cyclic voltammograms of an aqueous catholyte including 300 mM N,N' dimethyl thiourea and 0.45 M HCl before and after repeated cycling.

The solubility of N,N'-dimethyl thiourea (DMTU) in 6M HCl is approximately 4 M. To confirm the stability of an aqueous catholyte comprising DMTU in acid, repeated cycling overnight was performed with a catholyte including 300 mM DMTU and 0.45 M HCl. Cyclic voltammograms were obtained before and after the overnight test—initial E (V)=0, high E (V)=1, low E (V)=−0.8, initial P/N=P, scan rate (V/s)=0.05, segment=3, sample interval (V)=0.001, quiet time (s)=2, sensitivity (NV)=0.01. As seen in FIG. 2, no significant peak changes were found in the cyclic voltammogram curves, indicating good stability of DMTU in acid solutions.

Example 2

Zn/Zn$^{2+}$-Substituted Thiourea Redox Flow Battery System

A redox flow battery system having a zinc anode and a carbon cathode was constructed as described in the general procedure. An anion-exchange membrane was used as the separator. The aqueous anolyte included 100 mM ZnSO$_4$ and 1 M NaCl, and the aqueous catholyte included 200 mM N-methyl thiourea (MTU) and 1 M NaCl.

Figure 3:
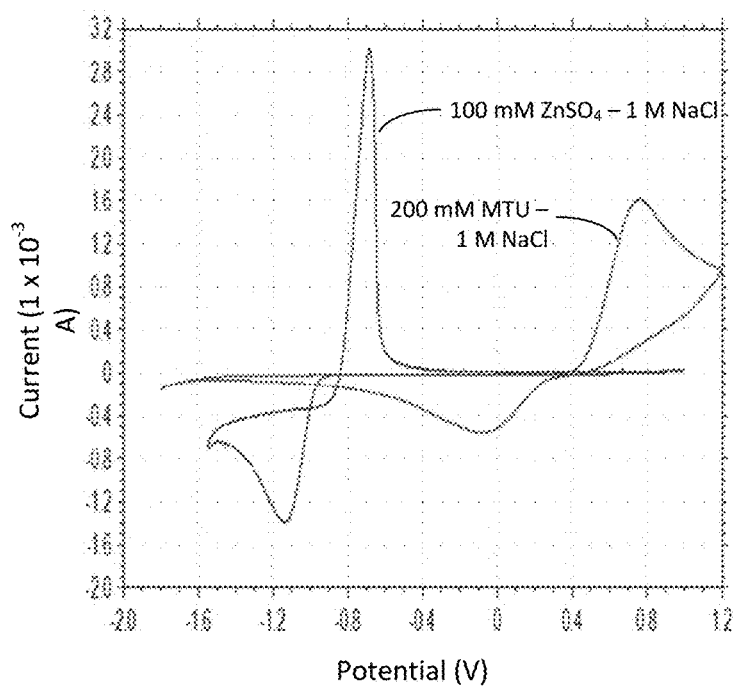
FIG. 3 shows cyclic voltammograms of an aqueous anolyte including 200 mM $ZnSO_4$ and 1 M NaCl, and an aqueous catholyte including 200 mM N-methyl thiourea and 1 M NaCl.
Figure 4:
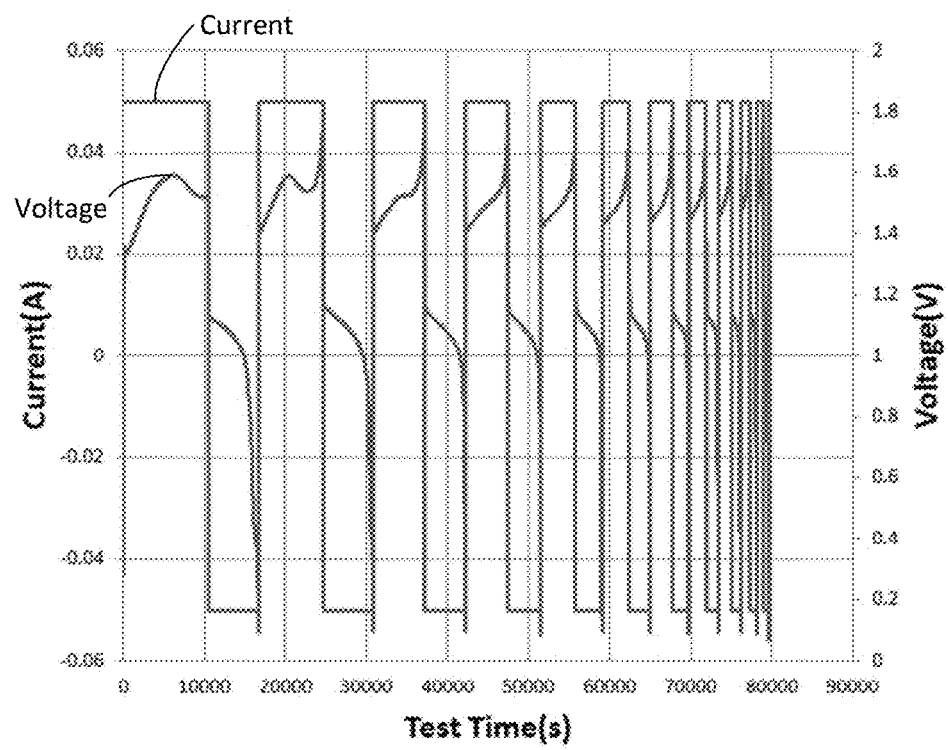
FIG. 4 shows current and voltage for repeated cycling of a redox flow battery system including an aqueous anolyte including 200 mM $ZnSO_4$ and 1 M NaCl, and an aqueous catholyte including 200 mM N-methyl thiourea and 1 M NaCl.

Cyclic voltammograms of the anolyte and catholyte are shown in FIG. 3—initial E (V)=0, high E (V)=1.2, low E (V)=−1.8, initial P/N=P, scan rate (V/s)=0.06, segment=6, sample interval (V)=0.001, quiet time (s)=2, sensitivity (A/V)=0.001. FIG. 4 shows current and voltage for repeated cycling of the redox flow battery system over 80,000 seconds. The current and voltage profiles remained substantially the same over 80,000 seconds. However, the cycle lengths decreased significantly over time, indicating capacity fade with repeated cycling. Cyclic voltammetry demonstrated that the substituted thiourea-based catholyte was stable. Capacity was restored when the anolyte was replaced with a fresh solution of 100 mM $ZnSO_4$ and 1 M NaCl, demonstrating that capacity fade was due to the anolyte and not attributable to substituted thiourea-based catholyte.

Example 3

$MV/MV^{2+}$-Substituted Thiourea Redox Flow Battery System

A redox flow battery system having carbon electrodes as described in the general procedure was constructed. An anion-exchange membrane was used as the separator. The aqueous anolyte included 200 mM methyl viologen (MV) and 1 M NaCl, and the aqueous catholyte included 200 mM MTU and 1 M NaCl.

Figure 5:
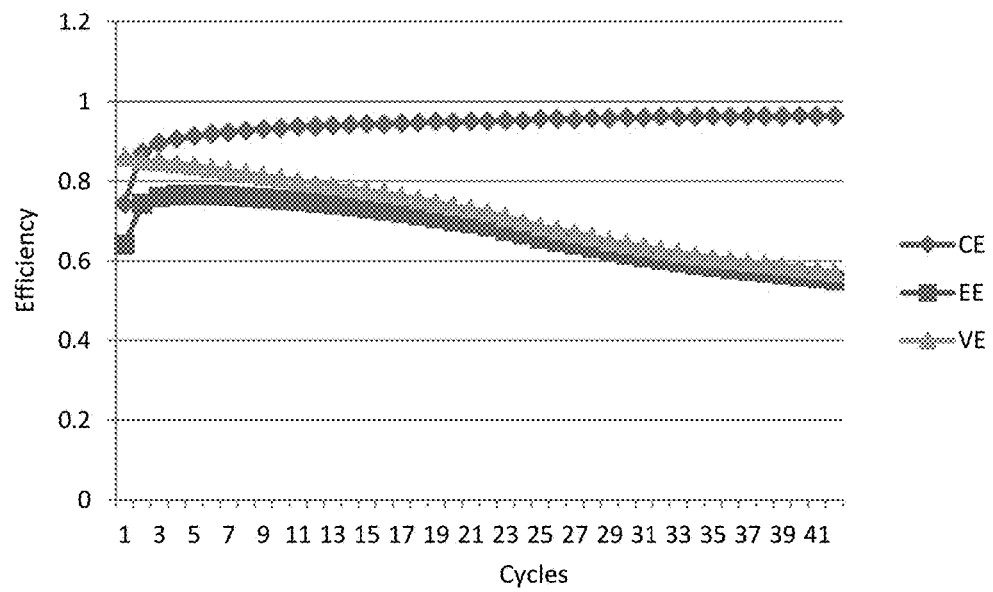
FIG. 5 is a graph showing coulombic, energy, and voltage efficiency over repeated cycling of a redox flow battery system including an aqueous anolyte including 200 mM methyl viologen and 1 M NaCl, and an aqueous catholyte including 200 mM N-methyl thiourea and 1 M NaCl.
Figure 6:
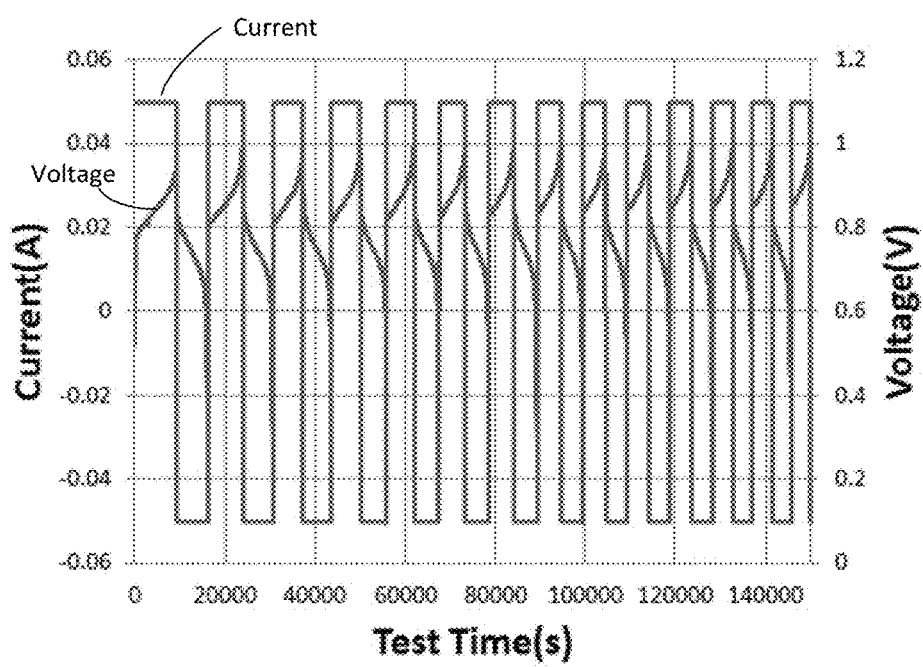
FIG. 6 shows current and voltage for repeated cycling of the redox flow battery system of FIG. 5.

FIG. 5 shows the coulombic efficiency (♦), energy efficiency (■) and voltage efficiency (▲) of the battery system over 41 cycles. As seen in FIG. 5, the coulombic efficiency remained near 100% throughout the cycles, whereas slight decreases (about 25%) were seen in the energy efficiency and voltage efficiency. FIG. 6 shows current and voltage for repeated cycling of the battery system over 150,000 seconds. The current and voltage profiles remained substantially the same, although the cycle lengths showed some decrease over time, indicating some capacity fade with repeated cycling.

Example 4

$Fe/Fe^{2+}$-Substituted Thiourea Redox Flow Battery System

A redox flow battery system having a graphite felt anode and a graphite felt cathode was constructed as described in the general procedure. An anion-exchange membrane was used as the separator. The aqueous anolyte included 200 mM $FeCl_2$ and 1 M NaCl, and the aqueous catholyte included 200 mM MTU and 1 M NaCl.

Figure 7:
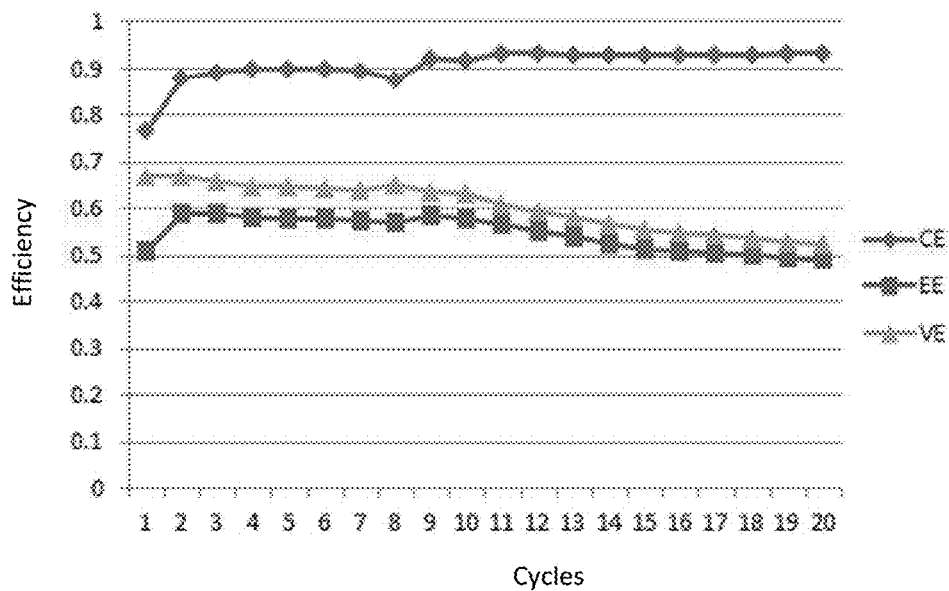
FIG. 7 is a graph showing coulombic, energy, and voltage efficiency over repeated cycling of a redox flow battery system including an aqueous anolyte including 200 mM $FeCl_2$ and 1 M NaCl, and an aqueous catholyte including 200 mM N-methyl thiourea and 1 M NaCl.
Figure 8:
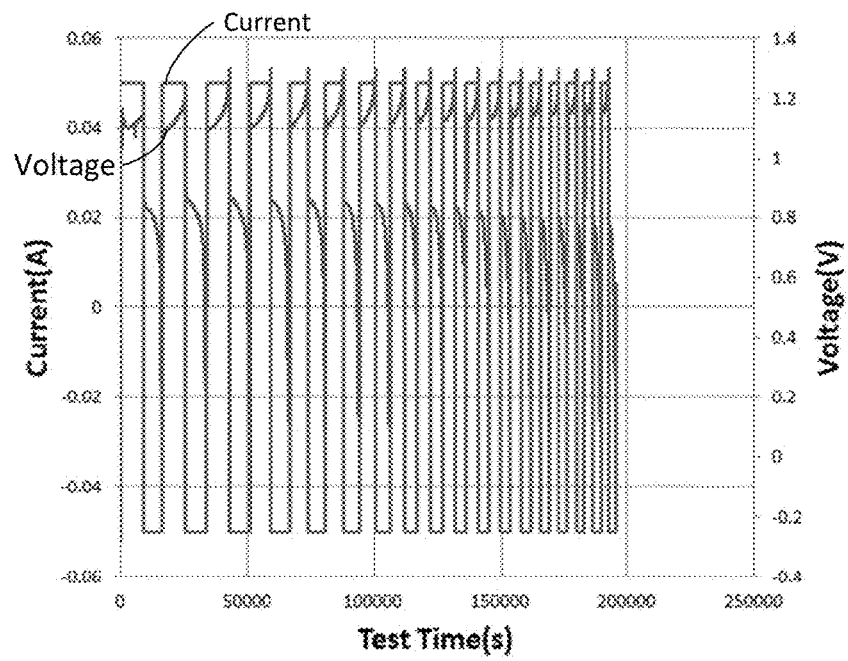
FIG. 8 shows current and voltage for repeated cycling of the redox flow battery system of FIG. 7.

FIG. 7 shows the coulombic efficiency (♦), energy efficiency (■) and voltage efficiency (▼) of the battery system over 20 cycles. As seen in FIG. 7, the coulombic efficiency remained at 90-95% throughout the cycles, whereas slight decreases (about 15-20%) were seen in the energy efficiency and voltage efficiency. FIG. 8 shows current and voltage for repeated cycling of the battery system over 200,000 seconds. The current and voltage profiles remained substantially the same, although the cycle lengths decreased significantly over time, indicating capacity fade with repeated cycling.

Example 5

Comparison of N-Methyl Thiourea and N,N'-Dimethyl Thiourea

Figure 9:
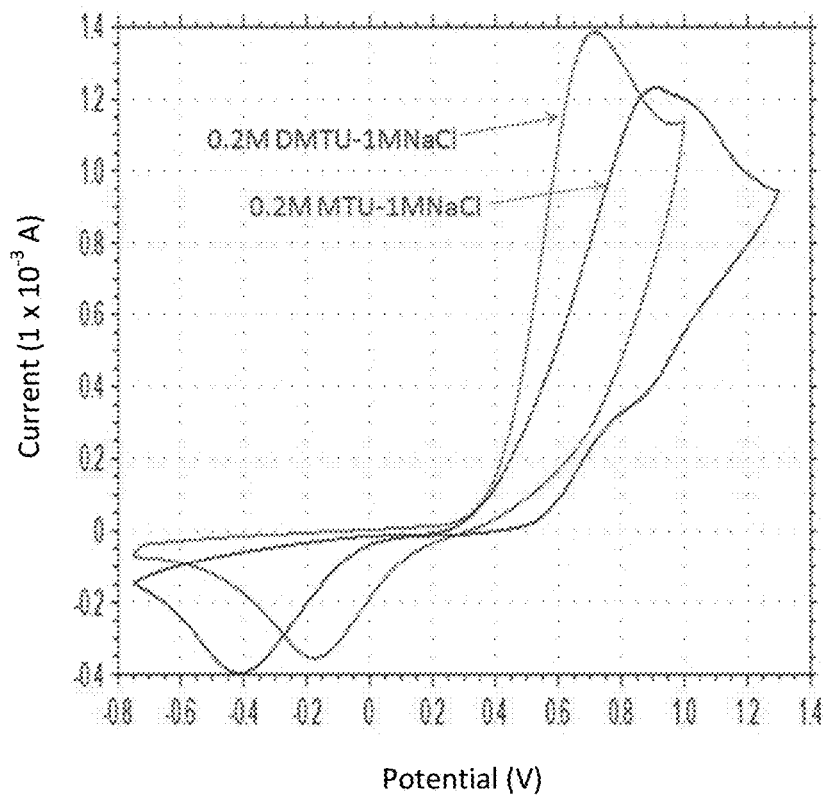
FIG. 9 shows cyclic voltammograms of aqueous catholytes including (1) 200 mM N-methyl thiourea-1 M NaCl, and (2) 200 mM N,N'-dimethyl thiourea-1 M NaCl.

Aqueous catholytes comprising 200 mM MTU and 200 mM DMTU were compared. Each catholyte also included 1 M NaCl. Cyclic voltammetry was performed under the following conditions: initial E (V)=0, high E (V)=1, low E (V)=−0.75, initial P/N=P, scan rate (V/s)=0.05, segment=7, sample interval (V)=0.001, quiet time (s)=2, sensitivity (A/V)=0.001. The results demonstrated that DMTU had better kinetics, with better reversibility and a lower overpotential (FIG. 9).

Example 6

Evaluation of Viologen Anolytes

Figure 10:
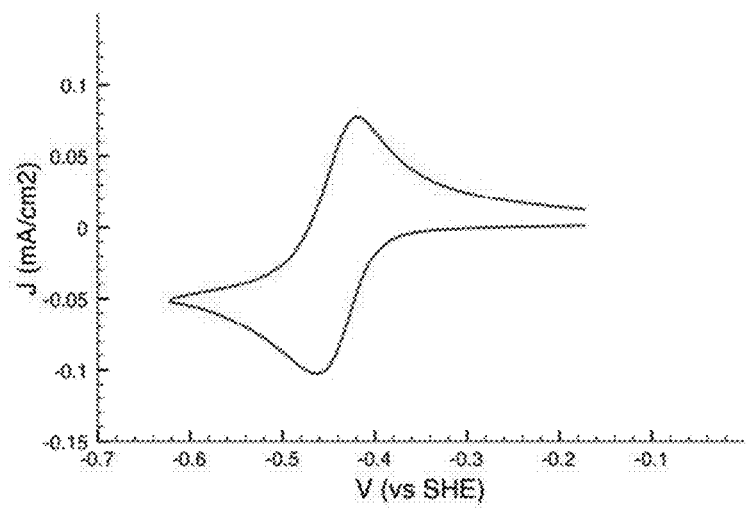
FIG. 10 is a cyclic voltammogram of an aqueous anolyte including 2.0 mM ethyl viologen and 1.0 M KI.

Ethyl viologen diiodide (EV) has a stable one electron reduction couple at −0.44 V vs. SHE in a neutral aqueous solution comprising 2.0 mM ethyl viologen and 1.0 M KI (FIG. 10). Cyclic voltammetry was performed at 0.05 V/s with a glassy carbon working electrode. The second electron reduction couple is about +1.48 V vs. SHE in neutral aqueous solution, and is not reversible. Solubility tests confirmed a solubility of EV up to 3M in water.

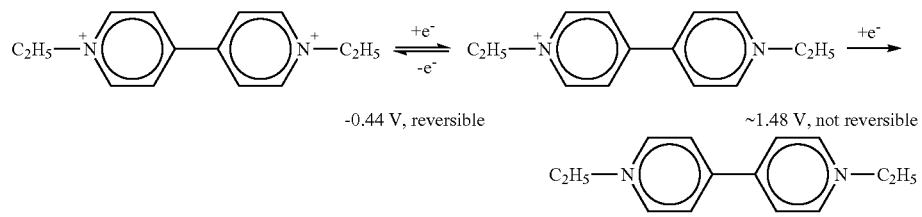

−0.44 V, reversible                    ~1.48 V, not reversible

Figure 11:
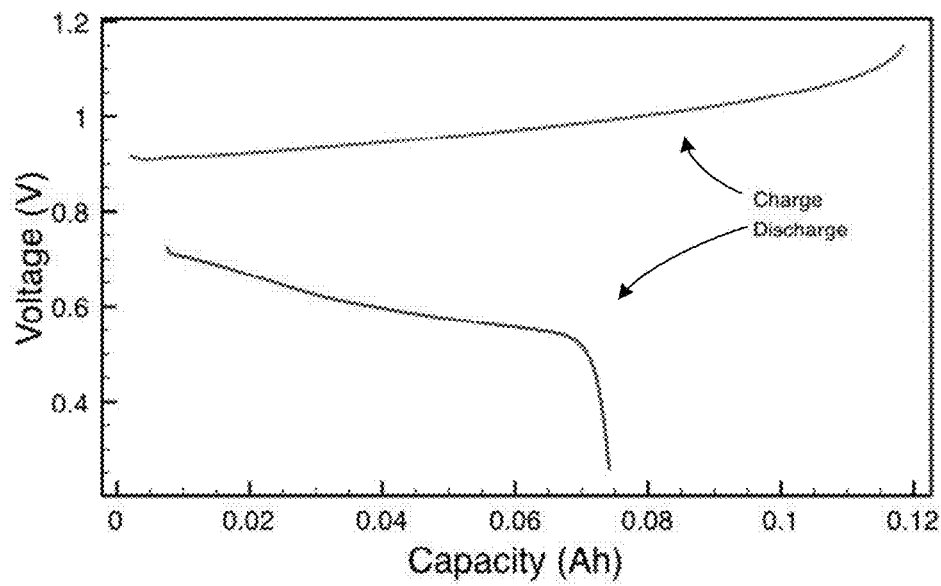
FIG. 11 shows charge and discharge profiles of a flow cell having an anolyte comprising 0.1 M ethyl viologen in 1.0 M KI aqueous solution and a catholyte comprising 1.0 M KI aqueous solution. The charge rate was 5 mA/h.

A flow cell was constructed using the configuration shown in FIG. 1. The anolyte was 0.1 M EV in 1.0 M KI aqueous solution. The catholyte was a 0.2 M KI aqueous solution, which utilizes $I^{3-}/I^-$ (0.53 V vs. SHE) as the catholyte redox couple. A piece of cation exchange membrane (Nafion® membrane, E.I. du Pont de Nemours and Company) was used as the cell membrane. The charge rate was 5 mA/h. FIG. 11 shows the charge and discharge profiles.

Figure 12:
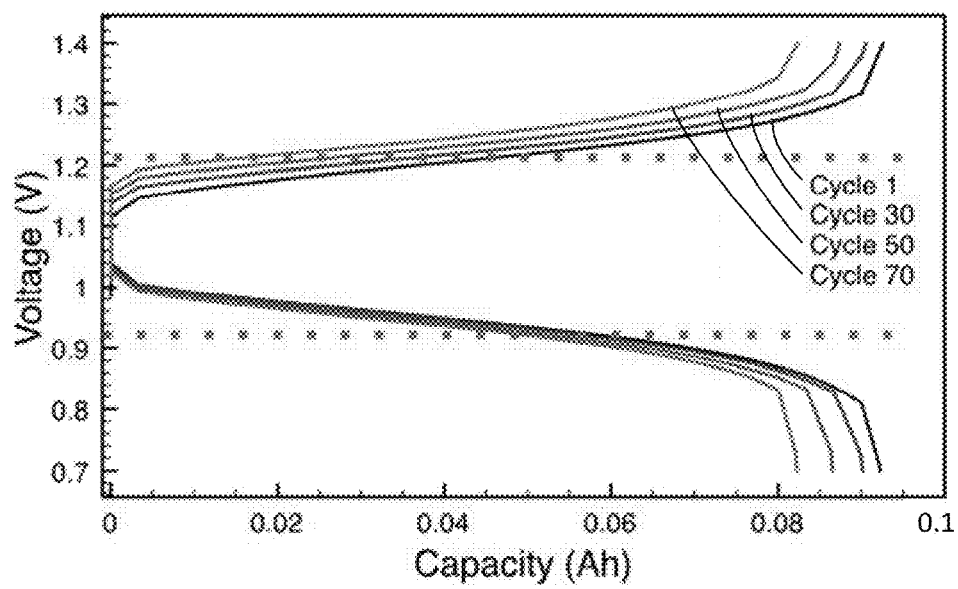
FIG. 12 shows the charge and discharge voltage profiles of a flow cell having an aqueous anolyte comprising 0.1 M methyl viologen in 1.0 M NaCl, and an aqueous catholyte comprising 0.1 M FeCl$_2$ in 1.0 M NaCl.
Figure 13:
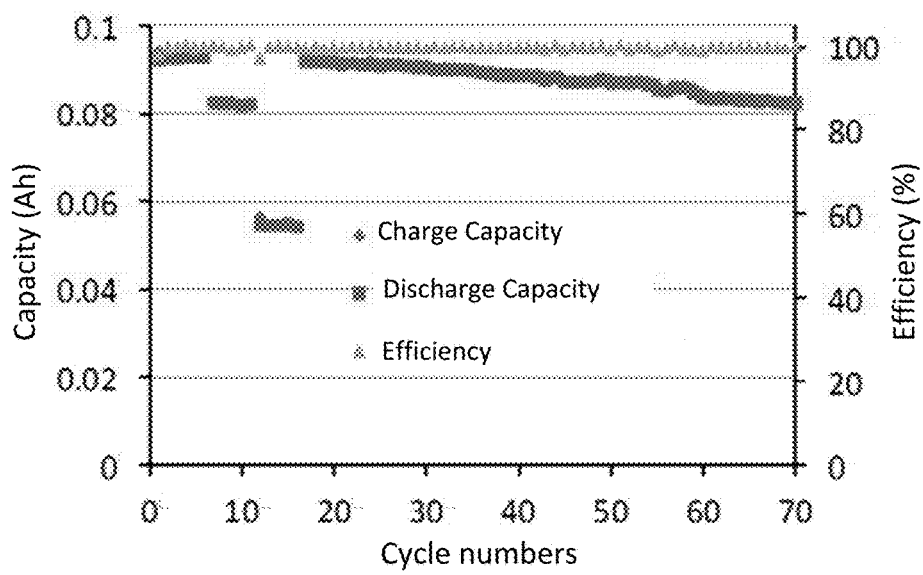
FIG. 13 shows the cyclic charge capacity, discharge capacity, and efficiency of the flow cell of FIG. 12.

Methyl viologen ($MV^{2+}$) was paired with a $Fe^{2+}/Fe^{3+}$ redox couple to construct a flow battery with an open cell voltage of 1.21V. A flow cell was constructed similar to the one shown in FIG. 1 with 0.1 M $MV.Cl_2$ and 0.1 M $FeCl_2$ dissolved in 1.0 M NaCl aqueous solution as the anolyte and catholyte, respectively. An anion exchange membrane was used as the cell membrane. Nitrogen gas was used as protection in the anolyte. The cycling performance was determined over 70 cycles. As shown in FIG. 12, the voltage profile remained substantially the same over 70 cycles. The cyclic charge capacity, discharge capacity, and efficiency are shown in FIG. 13. The results demonstrate that efficiency remained at or near 100% over 70 cycles, and capacity decreased by less than 20%.

Example 7

Evaluation of a Nitroxyl Radical Compound-Based Catholyte

HTMPO (4-hydroxy-2,2,6,6-tetramethylpiperidine 1-oxyl) has a stable one electron redox couple at 0.75 V vs. SHE in •aqueous solution. HTMPO has a solubility up to 3 M in water. An aqueous redox flow cell including a catholyte comprising HTMPO and an anolyte comprising methyl viologen undergoes the following reactions.

Cathode

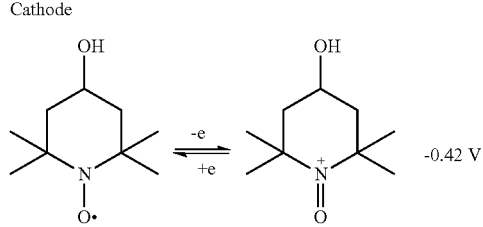

-0.42 V

Anode

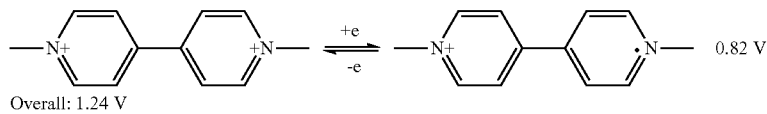

0.82 V

Overall: 1.24 V

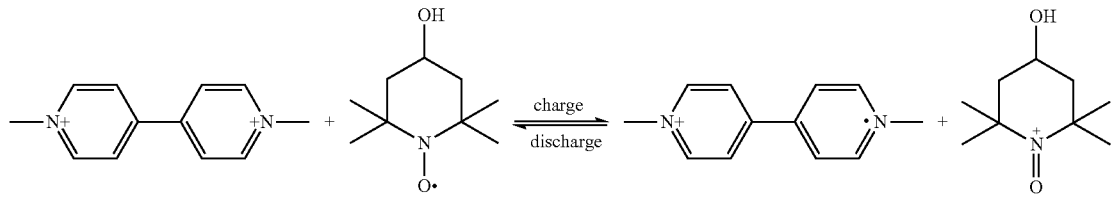

Figure 14:
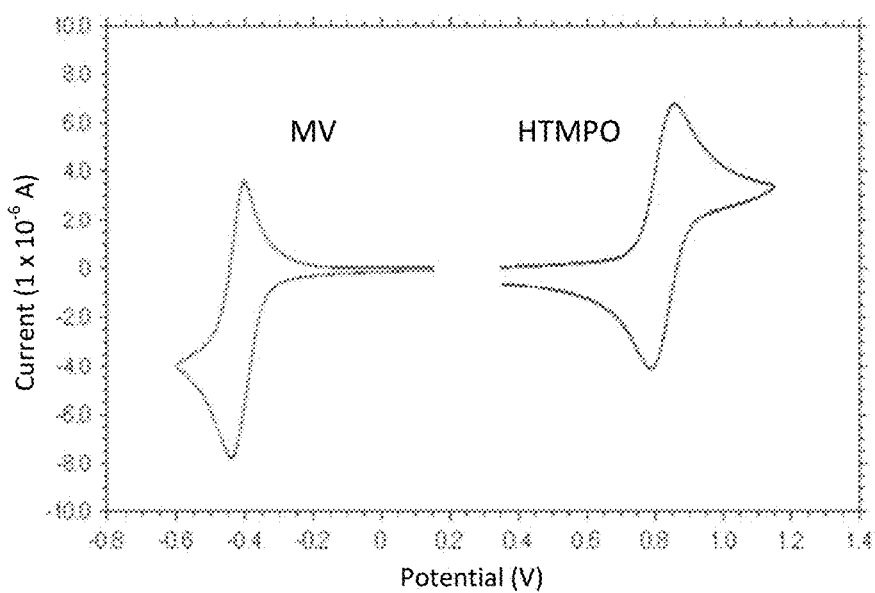
FIG. 14 shows cyclic voltammograms of an aqueous anolyte including 10 mM methyl viologen (MV) in 2.0 M NaCl (left), and an aqueous catholyte including 10 mM 4-hydroxy-2,2,6,6-tetramethylpiperidine 1-oxyl (HTMPO) in 2.0 M NaCl (right).

FIG. 14 shows cyclic voltammograms of an aqueous anolyte comprising 10 mM methyl viologen (MV) in 2.0 M NaCl (left), and an aqueous catholyte comprising 10 mM 4-hydroxy-2,2,6,6-tetramethylpiperidine 1-oxyl (HTMPO) in 2.0 M NaCl (right).

Figure 15:
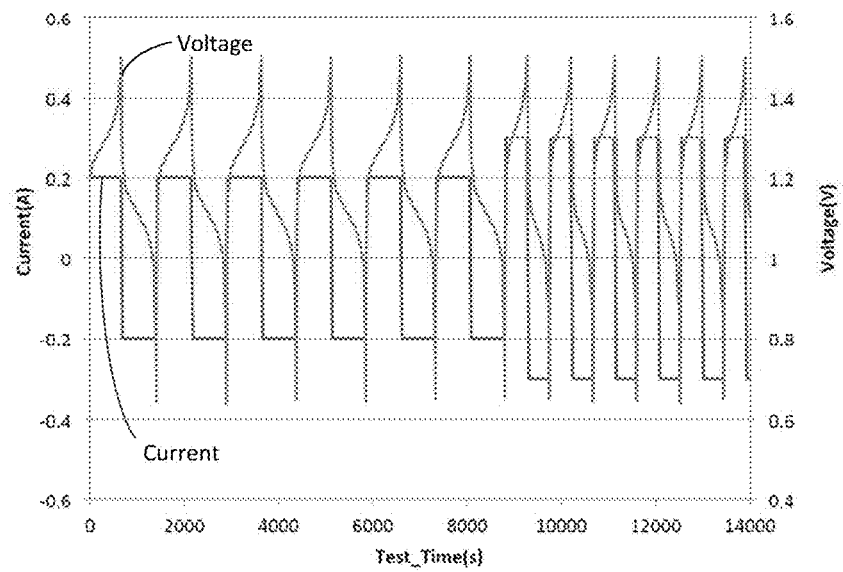
FIG. 15 shows current and voltage for repeated cycling of a redox flow battery system including an aqueous anolyte comprising 0.1 M methyl viologen and 1.0 M NaCl, and an aqueous catholyte including 0.1 M HTMPO and 1.0 M NaCl.
Figure 16:
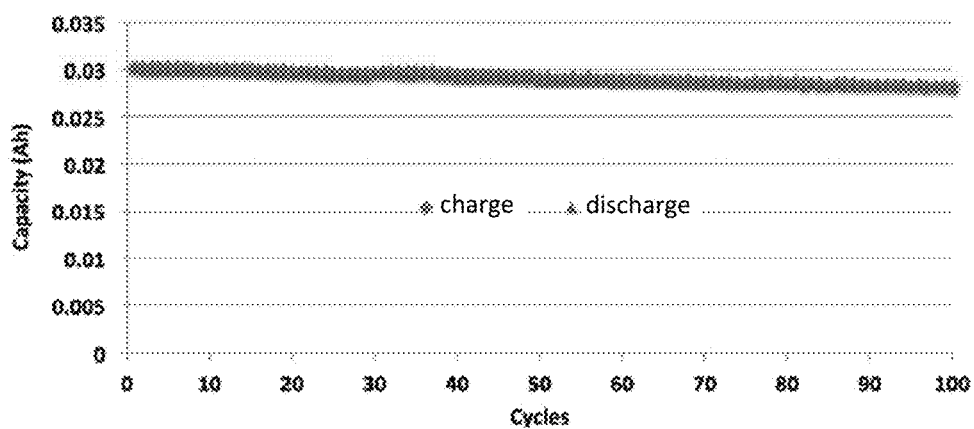
FIG. 16 shows cycling data and charge efficiency of the system of FIG. 15 over 100 cycles.

An aqueous redox flow battery system was prepared with an anolyte comprising 0.1 M MV and 1.0 M NaCl, a catholyte comprising 0.1 M HTMPO and 1.0 M NaCl, and an AMV anion membrane (Selemion™ AMV ion exchange membrane, Asahi Glass, Japan). The anode and cathode were carbon felt. The charge rate was 30 mA/h. FIG. 15 shows current and voltage for repeated cycling of the battery system. FIG. 16 shows cycling data and charge efficiency of the system over 100 cycles. As shown in FIGS. 15 and 16, the cell exhibited stable cycling over 100 cycles at 30 mA/cm².

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. An aqueous catholyte for use in a redox flow battery system, comprising:
   a catholyte aqueous supporting solution; and
   an electrochemically active component comprising
   (i) a monosubstituted, disubstituted, trisubstituted, or tetrasubstituted thiourea having a general formula I

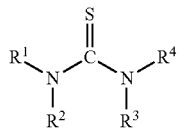

(I)

wherein $R^1$-$R^4$ independently are hydrogen, aliphatic, substituted aliphatic, alkoxy, substituted alkoxy, acyl, substituted acyl, aryl, substituted aryl, arylalkyl, substituted arylalkyl, alkylaryl, or substituted alkylaryl, the optionally substituted thiourea having a concentration sufficient to charge a redox flow battery system when the optionally substituted thiourea is oxidized, and/or
   (ii) a water-soluble nitroxyl radical compound having a general formula II

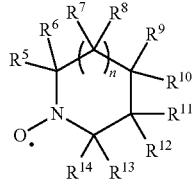

(II)

wherein n is 0, 1, or 2,
   $R^5$-$R^6$ and $R^9$-$R^{14}$ independently are hydrogen, aliphatic, substituted aliphatic, halo, hydroxyl, carboxyl, amino, cyano, or thiol, and
   each $R^7$ and $R^8$ independently is hydrogen, optionally substituted aliphatic, halo, hydroxyl, carboxyl, amino, cyano, or thiol, the water-soluble nitroxyl radical compound having a concentration sufficient to charge a redox flow battery system when the water-soluble nitroxyl radical compound is oxidized.

2. The aqueous catholyte of claim 1, wherein the monosubstituted, disubstituted, trisubstituted, or tetrasubstituted thiourea is an alkyl-substituted thiourea.

3. The aqueous catholyte of claim 1, wherein the monosubstituted, disubstituted, trisubstituted, or tetrasubstituted thiourea is N-methyl thiourea, N,N'-dimethyl thiourea, N-ethyl thiourea, N,N'-diethyl thiourea, tetramethyl thiourea, tetraethyl thiourea, or any combination thereof.

4. The aqueous catholyte of claim 1, wherein:
$R^5$, $R^6$ and $R^{11}$-$R^{14}$ independently are hydrogen or $C_1$-$C_{10}$ alkyl;
each $R^7$ and $R^8$ independently is hydrogen or $C_1$-$C_{10}$ alkyl; and
at least one of $R^9$ and $R^{10}$ is other than hydrogen.

5. The aqueous catholyte of claim 1, wherein:
$R^5$, $R^6$, $R^{13}$, and $R^{14}$ are independently $C_1$-$C_{10}$ alkyl;
$R^7$, $R^8$, $R^{11}$, and $R^{12}$ are hydrogen; and
at least one of $R^9$ and $R^{10}$ is hydroxyl, amino, carboxyl, or cyano.

6. The aqueous catholyte of claim 1, wherein the water-soluble nitroxyl radical compound is:

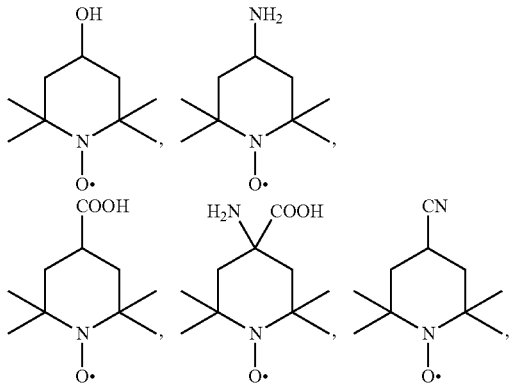

or any combination thereof.

7. The aqueous catholyte of claim 1, wherein the catholyte, prior to charging, has a concentration of the monosubstituted, disubstituted, trisubstituted, or tetrasubstituted thiourea within a range of 0.05 M to 5 M and/or a concentration of the water-soluble nitroxyl radical compound within a range of 1 mM to 5 M.

8. The aqueous catholyte of claim 1, wherein the catholyte aqueous supporting solution comprises a binary acid, an alkali metal halide, or a combination thereof.

9. The aqueous catholyte of claim 1, wherein the catholyte aqueous supporting solution comprises a halide ($X^-$) source, and $[X^-] \geq$ [electrochemically active component].

10. The aqueous catholyte of claim 1, wherein:
the catholyte aqueous supporting solution comprises (i) a proton source, (ii) a halide source, or (iii) a proton source and a halide source.

11. An aqueous electrolyte system for use in a redox flow battery system, comprising:
an aqueous catholyte according to claim 1;
an aqueous anolyte.

12. The aqueous electrolyte system of claim 11, wherein the aqueous anolyte comprises:
an anolyte aqueous supporting solution; and
metal cations or a viologen compound comprising cations having a general formula

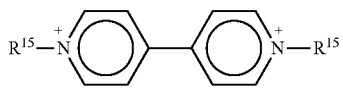

wherein $R^{15}$ is aliphatic, substituted aliphatic, aryl, substituted aryl, arylalkyl, or substituted arylalkyl.

13. The aqueous electrolyte system of claim 12, wherein:
the anolyte comprises metal cations, and each of the anolyte aqueous supporting solution and the aqueous catholyte supporting solution independently comprises (i) a proton source, (ii) a halide source, or (iii) a proton source and a halide source; or
the anolyte comprises the viologen compound, and each of the aqueous anolyte supporting solution and the aqueous catholyte supporting solution independently comprises a non-acidic halide source.

14. A redox flow battery system, comprising:
the aqueous electrolyte system of claim 11; and
an ion-exchange membrane or porous separator.

15. The redox flow battery system of claim 14, wherein when the redox flow battery system is at least partially charged:
the catholyte comprises a redox pair consisting of (i) the monosubstituted, disubstituted, trisubstituted, or tetrasubstituted thiourea and corresponding formamidinium disulfide cations, or (ii) the water-soluble nitroxyl radical compound and corresponding nitroxyl compound cations; and
the anolyte comprises (a) a metal redox pair comprising the metal cations or (b) a viologen redox pair consisting of +2 and +1 viologen cations.

16. The redox flow battery system of claim 14, wherein when the redox flow battery system is at least partially charged, the catholyte consists essentially of:
(a) the monosubstituted, disubstituted, trisubstituted, or tetrasubstituted thiourea and corresponding formamidinium disulfide cations, and the aqueous catholyte supporting solution, wherein the aqueous catholyte supporting solution consists essentially of (i) water and (ii) the proton source, the halide source, or both the proton source and the halide source; or
(b) the water-soluble nitroxyl radical compound and corresponding nitroxyl compound cations, and the aqueous catholyte supporting solution, wherein the aqueous catholyte supporting solution consists essentially of (i) water and (ii) the proton source, the halide source, or both the proton source and the halide source.

17. An aqueous catholyte for use in a redox flow battery system, comprising an electrochemically active component and a catholyte aqueous supporting solution, wherein:
(i) the electrochemically active component is an optionally substituted thiourea having a general formula I

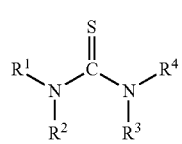

wherein $R^1$-$R^4$ independently are hydrogen, aliphatic, substituted aliphatic, alkoxy, substituted alkoxy, acyl, substituted acyl, aryl, substituted aryl, arylalkyl, substituted arylalkyl, alkylaryl, or substituted alkylaryl, the optionally substituted thiourea having a concentration sufficient to charge a redox flow battery system when the optionally substituted thiourea is oxidized, and the catholyte aqueous supporting solution comprises NaCl, KCl, HCl, or a combination thereof; or (ii) the electrochemically active component is a water-soluble nitroxyl radical compound, and the catholyte aqueous supporting solution comprises NaCl, KCl, or a combination thereof.

18. An aqueous catholyte for use in a redox flow battery system, wherein, prior to charging, the catholyte consists essentially of an electrochemically active component and a catholyte aqueous supporting solution, wherein:
   (i) the electrochemically active component is an optionally substituted thiourea having a general formula I

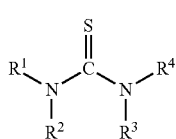
(I)

wherein $R^1$-$R^4$ independently are hydrogen, aliphatic, substituted aliphatic, alkoxy, substituted alkoxy, acyl, substituted acyl, aryl, substituted aryl, arylalkyl, substituted arylalkyl, alkylaryl, or substituted alkylaryl, the optionally substituted thiourea having a concentration sufficient to charge a redox flow battery system when the optionally substituted thiourea is oxidized, and/or
a water-soluble nitroxyl radical compound having a general formula II

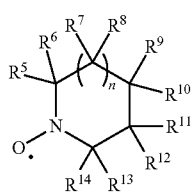
(II)

wherein n is 0, 1, or 2,
$R^5$-$R^6$ and R9-R14 independently are hydrogen, aliphatic, substituted aliphatic, halo, hydroxyl, carboxyl, amino, cyano, or thiol, and
each R7 and R8 independently is hydrogen, optionally substituted aliphatic, halo, hydroxyl, carboxyl, amino, cyano, or thiol, the water-soluble nitroxyl radical compound having a concentration sufficient to charge a redox flow battery system when the water-soluble nitroxyl radical compound is oxidized; and
   (ii) the aqueous catholyte supporting solution consists essentially of (i) water and (ii) a proton source, a halide source, or both a proton source and a halide source.

19. An aqueous electrolyte system for use in a redox flow battery system, comprising:
   (i) an aqueous anolyte comprising
      a non-acidic anolyte aqueous supporting solution comprising an anolyte halide source, and
      a viologen compound providing viologen cations having a general formula

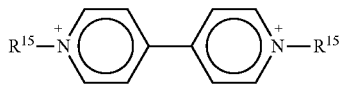

wherein $R^{15}$ is aliphatic, substituted aliphatic, aryl, or substituted aryl, the viologen compound having a concentration sufficient to charge a redox flow battery system when the viologen compound is reduced; and
   (ii) an aqueous catholyte comprising a non-acidic catholyte aqueous supporting solution comprising a catholyte halide source and one of the following
      (a) redox-active transition metal cations,
      (b) an optionally substituted thiourea having a general formula I

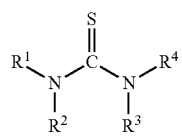
(I)

wherein $R^1$-$R^4$ independently are hydrogen, aliphatic, substituted aliphatic, alkoxy, substituted alkoxy, acyl, substituted acyl, aryl, substituted aryl, arylalkyl, substituted arylalkyl, alkylaryl, or substituted alkylaryl, the optionally substituted thiourea having a concentration sufficient to charge a redox flow battery system when the optionally substituted thiourea is oxidized, or
      (c) a water-soluble nitroxyl radical compound having a general formula II

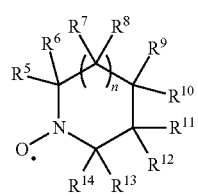
(II)

wherein n is 0, 1, or 2,
$R^5$, $R^6$ and $R^9$-$R^{14}$ independently are hydrogen, aliphatic, substituted aliphatic, halo, hydroxyl, carboxyl, amino, cyano, or thiol, and
each $R^7$ and $R^8$ independently is hydrogen, optionally substituted aliphatic, halo, hydroxyl, carboxyl, amino, cyano, or thiol, the water-soluble nitroxyl radical compound having a concentration sufficient to charge a redox flow battery system when the water-soluble nitroxyl radical compound is oxidized.

20. The aqueous electrolyte system of claim 19, wherein $R^{15}$ is $C_1$-$C_{10}$ alkyl, aryl, or arylalkyl.

21. The aqueous electrolyte system of claim 19, wherein the viologen compound is any of methyl viologen, ethyl viologen, phenyl viologen, benzyl viologen, or any combination thereof.

22. The aqueous electrolyte system of claim 19, wherein the aqueous anolyte consists essentially of the viologen compound, water, and the anolyte halide source.

23. The aqueous electrolyte system of claim 19, wherein the aqueous catholyte comprises:

N-methyl thiourea, N,N'-dimethyl thiourea, N-ethyl thiourea, N,N'-diethyl thiourea, tetramethyl thiourea, tetraethyl thiourea, or any combination thereof; or

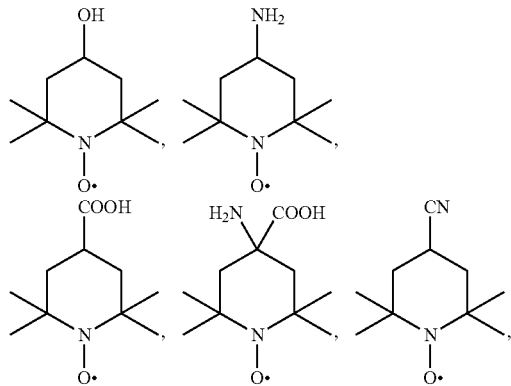

or any combination thereof.

24. A redox flow battery system, comprising:
an aqueous electrolyte system according to claim 19; and
an ion-exchange membrane or porous separator.

25. The redox flow battery system of claim 24, wherein when the redox flow battery system is at least partially charged:
the aqueous anolyte comprises a viologen redox pair consisting of +2 and +1 viologen cations; and
the aqueous catholyte comprises a redox pair consisting of (i) an optionally substituted thiourea and corresponding formamidinium disulfide cations, (ii) a water-soluble nitroxyl radical compound and corresponding nitroxyl compound cations, or (iii) a $X^-/X_3^-$ redox pair where X is Br or I.

26. The redox flow battery system of claim 24, wherein when the redox flow battery system is at least partially charged:
the aqueous anolyte consists essentially of a viologen redox pair consisting of +2 and +1 viologen cations, water, and the anolyte halide source.

* * * * *